US012794091B2

(12) United States Patent
Cronin et al.

(10) Patent No.: US 12,794,091 B2
(45) Date of Patent: Nov. 10, 2026

(54) BATTERY CELL AND BATTERY DEVICE HAVING THE SAME

(71) Applicant: SK ON CO., LTD., Seoul (KR)

(72) Inventors: John Cronin, Jericho, VT (US); Do Il Park, Daejeon (KR); Soo Min Park, Daejeon (KR); Hyung Ju Paik, Daejeon (KR); Hae Ryong Jeon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 634 days.

(21) Appl. No.: 18/362,967

(22) Filed: Aug. 1, 2023

(65) Prior Publication Data

US 2024/0195031 A1 Jun. 13, 2024

Related U.S. Application Data

(60) Provisional application No. 63/430,873, filed on Dec. 7, 2022.

(51) Int. Cl.

| | |
|---|---|
| ***H01M 50/583*** | (2021.01) |
| ***H01M 50/103*** | (2021.01) |
| ***H01M 50/15*** | (2021.01) |
| ***H01M 50/209*** | (2021.01) |
| ***H01M 50/342*** | (2021.01) |
| ***H02J 7/61*** | (2026.01) |

(52) U.S. Cl.
CPC ....... *H01M 50/583* (2021.01); *H01M 50/103* (2021.01); *H01M 50/15* (2021.01); *H01M 50/209* (2021.01); *H01M 50/3425* (2021.01); *H02J 7/61* (2026.01)

(58) Field of Classification Search
None
See application file for complete search history.

(56) References Cited

U.S. PATENT DOCUMENTS

| | | | | |
|---|---|---|---|---|
| 10,665,829 | B2 | 5/2020 | Wakimoto et al. | |
| 11,404,754 | B2 | 8/2022 | Wakimoto et al. | |
| 2018/0358648 | A1* | 12/2018 | Guen | H01M 4/662 |
| 2019/0027717 | A1* | 1/2019 | Chen | H01M 50/147 |
| 2020/0227715 | A1* | 7/2020 | Koo | H01M 50/169 |
| 2022/0021090 | A1* | 1/2022 | Shin | H01M 10/482 |
| 2022/0123447 | A1 | 4/2022 | Zhang | |

* cited by examiner

*Primary Examiner* — Scott J. Chmielecki
(74) *Attorney, Agent, or Firm* — IP & T GROUP LLP

(57) ABSTRACT

Provided is a battery cell including: a case configured to accommodate an electrode assembly; a cap plate configured to cover the case; an electrode terminal disposed on the cap plate and electrically connected to the electrode assembly; a vent cover disposed in a venting hole to open the venting hole when pressure inside the case is equal to or greater than a predetermined pressure; and a vent fuse electrically connected to the electrode terminal and configured to operate to block current flow between the electrode terminal and the outside thereof by discharging gas through the vent cover or by deforming the vent cover.

20 Claims, 20 Drawing Sheets

BATTERY CELL AND BATTERY DEVICE HAVING THE SAME

CROSS-REFERENCE TO RELATED APPLICATION(S)

This patent document claims the benefit of U.S. Provisional Patent Application No. 63/430,873 filed on Dec. 7, 2022, the disclosure of which is incorporated herein by reference in its entirety.

TECHNICAL FIELD

The technology and implementations disclosed in this patent document generally relate to a secondary battery cell capable of electrical charging and discharging and a battery device having the same.

BACKGROUND

Battery cells may have issues with a temperature/and pressure increase when excessive heat and pressure builds up in a can (case) thereof. An increase in pressure of a battery cell may compromise the functional safety and reliability of prismatic battery cells.

In addition, when various events occur, such as when a battery cell reaches the end of a lifespan thereof, when a swelling phenomenon occurs in a battery cell, when an overcharge occurs in a battery cell, when a battery cell is exposed to heat, when a sharp object such as a nail penetrates the case of a battery cell, and when an external shock is applied to a battery cell, temperature and/or pressure of the battery cell may increase, and a fire may accordingly occur. A flame or high-temperature gas ejected from a battery cell may cause chain ignition of other, adjacent battery cells accommodated in a battery device.

SUMMARY

According to an aspect of the disclosed technology, a battery cell that can block or limit the flow of current in the battery cell when an event occurs in the battery cell may be provided. For example, according to an aspect of the disclosed technology, it is possible to block the flow of current in the battery cell when internal pressure of the battery cell increases or gas is discharged from the battery cell.

Furthermore, according to an aspect of the disclosed technology, provided is a battery cell that can delay or reduce thermal runaway of a series of flame propagations from a battery cell having an increased internal pressure or a battery cell undergoing gas discharge to an adjacent battery cell, and a battery device having the same.

A battery cell in the present disclosure may be widely applied in green technology fields such as electric vehicles, battery charging stations, solar power generation using other batteries, and wind power generation. Also, the battery cell in the present disclosure may be used in eco-friendly electric vehicles, hybrid vehicles, and the like to prevent climate change by suppressing air pollution and greenhouse gas emission.

In some embodiments of the disclosed technology, a battery cell includes a case configured to accommodate an electrode assembly; a cap plate configured to cover the case; an electrode terminal disposed on the cap plate and electrically connected to the electrode assembly; a vent cover disposed in a venting hole to open the venting hole when pressure inside the case is equal to or greater than a predetermined pressure; and a vent fuse electrically connected to the electrode terminal and configured to operate to block current flow between the electrode terminal and the outside thereof by discharging gas through the vent cover or by deforming the vent cover.

According to one embodiment, the vent fuse may be attached to an external surface of the vent cover and may be disposed to cover at least a portion of the vent cover.

According to one embodiment, the venting hole may be disposed in at least one of the case and the cap plate.

The battery cell according to one embodiment may include: a circuit part electrically connected to the vent fuse and the electrode terminal, wherein the circuit part may operate in a first state in which current flow is permitted between the electrode terminal and the outside thereof, or may operate in a second state in which current flow between the electrode terminal and the outside thereof is blocked by operation of the vent fuse.

According to one embodiment, the circuit part is configured to electrically connect the electrode assembly and the electrode terminal in the first state and is configured to at least partially block an electrical connection between the electrode assembly and the electrode terminal in the second state.

According to one embodiment, the electrode terminal may include a cathode terminal electrically connected to a cathode foil of the electrode assembly and an anode terminal electrically connected to an anode foil of the electrode assembly, and in the first state, the circuit part electrically may be configured to connect the cathode terminal and the cathode foil, or may be configured to electrically connect the anode terminal and the anode foil, and in the second state, the circuit part may be configured to block an electrical connection between the cathode terminal and the cathode foil, or may be configured to block an electrical connection between the anode terminal and the anode foil.

According to one embodiment, the vent fuse may be provided as a normally closed vent fuse that is configured to be electrically connected to the circuit part in the first state and is configured not to be electrically connected to the circuit part in the second state.

According to one embodiment, the normally closed vent fuse may include a fuse part disposed on the vent cover and disconnected by discharging gas through the vent cover or by deforming the vent cover, a first terminal disposed on one side of the fuse part and electrically connected to the electrode terminal, and a second terminal disposed on the other side of the fuse part and electrically connected to the circuit part.

According to one embodiment, the fuse part may be attached to the vent cover to cross the vent cover.

According to one embodiment, the fuse part may include a conductive metal foil.

According to one embodiment, at least a portion of the fuse part may be configured to be melted and disconnected by discharging gas through the venting hole.

According to one embodiment, the circuit part may be provided as a transistor-type circuit part including a transistor functioning or configured to operate in the first state or in the second state.

According to one embodiment, the transistor-type circuit part may include a first link electrically connected to the normally closed vent fuse, a second link electrically connected to the electrode terminal, and a third link electrically connected to the electrode assembly, and the transistor-type circuit part includes at least one of a first resistor disposed between the first link and the transistor and a second resistor disposed between the second link and the transistor. In this case, a resistance of the first resistor may have a value greater than that of the second resistor.

According to one embodiment, the vent fuse may be provided as a normally open vent fuse that is configured not to be electrically connected to the circuit part in the first state and is configured to be electrically connected to the circuit part in the second state.

According to one embodiment, the normally open vent fuse may include a movable fuse part configured to attach at least portion thereof to the vent cover and move in an external direction of the cap plate by deforming the vent cover, and a fixed fuse part fixed to the vent cover or the cap plate, the fixed fuse part configured to be spaced apart from the movable fuse part in the first state and configured to be in contact with the movable fuse part by deforming the movable fuse part in the second state, and one of the movable fuse part and the fixed fuse part may be configured to be electrically connected to the electrode terminal, and the other thereof is configured to be electrically connected to the circuit part.

According to one embodiment, the normally open vent fuse may include a stopper configured to limit a moving range of at least one of the movable fuse part and the fixed fuse part so that the movable fuse part and the fixed fuse part do not come into contact with each other in the first state.

According to one embodiment, the circuit part may be provided as a relay-type circuit part including a relay functioning or configured to operate in the first state or operate in the second state.

According to one embodiment, the relay-type circuit part may include a switch configured to be switched to electrically connect an electrode foil of a first polarity of the electrode assembly to an electrode terminal of the first polarity, and a coil configured to be electrically connected between the normally open vent fuse and the electrode foil of the first polarity, the coil having a current applied thereto in the second state, and in the second state, the switch may be configured to be opened by the current flowing through the coil to block an electrical connection between the electrode foil of the first polarity and the electrode terminal of the first polarity.

The battery cell according to one embodiment may further include: a spring configured to provide elastic force to the switch so that in the first state, the switch maintains a state in which the electrode foil of the first polarity is electrically connected to the electrode terminal of the first polarity.

According to one embodiment, the normally open vent fuse may be configured to be electrically connected to an electrode terminal of a second polarity, and the coil may be configured to be electrically connected between the electrode foil of the first polarity and the electrode terminal of the second polarity in the second state.

The battery cell according to one embodiment may further include: a current limiting part disposed in series in the normally open vent fuse to limit a flow of a current equal to or greater than a set value in the coil in the second state.

In some embodiments of the disclosed technology, a battery device includes a plurality of battery cells; a housing configured to accommodate the plurality of battery cells; and a controller connected to at least one of the plurality of battery cells to control at least one of the plurality of battery cells, wherein at least one of the plurality of battery cells may include a case for accommodating an electrode assembly, a cap plate covering the case, an electrode terminal disposed on the cap plate and electrically connected to the electrode assembly, a vent cover disposed in a venting hole to open the venting hole when pressure inside the case is equal to or greater than a predetermined pressure, and a vent fuse electrically connected to the electrode terminal and configured to operate to block current flow between the electrode terminal and the outside thereof by discharging gas through the vent cover or by deforming the vent cover, and the controller may output an abnormal signal or blocks or limit an operation of at least one battery cell when at least one of a current and voltage is not detected from at least one of the plurality of battery cells.

According to one embodiment, when internal pressure of the battery cell is increased or when gas is discharged from a battery cell, current flow flowing in the battery cell may be blocked through a vent fuse, thereby improving stability of the battery cell.

According to one embodiment, stability of a battery device may be improved by sensing that internal pressure of some battery cells increases or gas discharge of some battery cells occurs, and controlling some battery cells having an abnormality or battery cells adjacent thereto.

According to one embodiment, it is possible to delay or reduce a thermal runaway phenomenon in which flames are sequentially propagated from a battery cell in which internal pressure is increased or gas is discharged to adjacent cells.

BRIEF DESCRIPTION OF DRAWINGS

Certain aspects, features, and advantages of the disclosed technology are illustrated by the following detailed description with reference to the accompanying drawings.

FIG. 6A is a perspective view viewed from above and FIG. 6B is a perspective view viewed from below.

FIG. 7A is a cross-sectional perspective views taken along line I-I' in FIG. 6A. FIG. 7B is a cross-sectional view illustrating a state before a vent cover is deformed. FIG. 7C is a cross-sectional view illustrating a state in which the vent cover is expanded or inflated, and FIG. 7D is a state in which the vent cover is broken.

FIG. 8A is a cross-sectional view illustrating a first modified example of a vent cover, FIG. 8B is a cross-sectional view illustrating a second modified example of a vent cover, and FIG. 8C is a cross-sectional perspective view illustrating a portion of the vent cover illustrated in FIG. 8B.

FIG. 13A illustrates a first state in which the normally open vent fuse is open, and FIG. 13B illustrates a second state in which the normally open vent fuse is closed.

FIG. 15B illustrates a state in which the normally open vent fuse is closed.

FIG. 17A illustrates current flow in a state in which the normally open vent fuse is open, and FIG. 17B illustrates current flow in a state in which the normally open vent fuse is closed.

DETAILED DESCRIPTION

Figure 1:
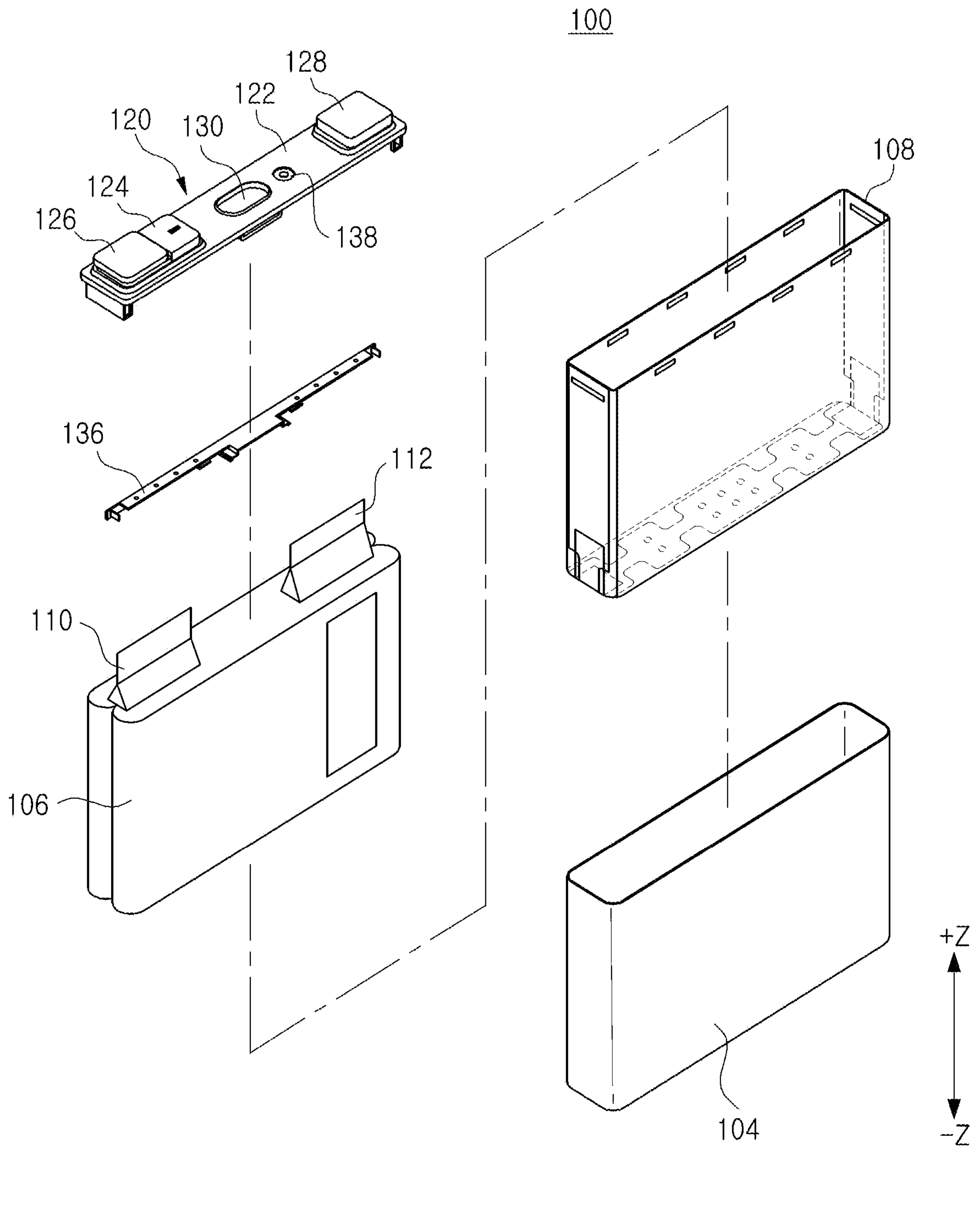
FIG. 1 is an exploded perspective view of a battery cell according to one embodiment.

Features of the disclosed technology disclosed in this patent document are described by example embodiments with reference to the accompanying drawings.

Embodiments of the disclosed technology will be more fully described below with reference to the accompanying drawings, and like numbers indicate like elements throughout the several views, and example embodiments are illustrated. However, embodiments of the claims may be implemented in many different forms and are not limited to the embodiments described herein. The examples given herein are non-limiting and only examples among other possible examples.

In the following description, 'including' a certain element means that other elements may be further included, rather than excluding other elements unless otherwise stated.

In addition, terms including ordinal numbers such as "first" and "second" used in this specification may be used to describe various components, and the components are not limited by the terms. These terms are only used for the purpose of distinguishing one component from another. For example, a first component may be termed a second component without departing from the scope of the disclosed technology, and similarly, the second element may also be termed the first element.

It should be noted that in the accompanying drawings, like elements are indicated by the same reference numerals as much as possible. In addition, detailed descriptions of well-known functions and configurations that may obscure the gist of the disclosed technology will be omitted. For the same reason, in the accompanying drawings, some components are exaggerated, omitted, or schematically illustrated, and the size of each component does not entirely reflect actual size.

FIG. 1 is an exploded perspective view of a battery cell according to an embodiment.

Referring to FIG. 1, a battery cell 100 may be a prismatic cell. Prismatic cells are widely used in powertrains of electric vehicles. The prismatic cells may be stacked together in a rectangular shape, allowing more efficient use of space. Prismatic cells are generally rectangular and have a higher power density than cylindrical cells. Prismatic cells also provide better performance in cold weather and less damage from vibration. However, prismatic cells may be more expensive to manufacture than cylindrical cells. In addition, prismatic cells are less likely to fail due to vibration or movement. Prismatic cells may deliver more power than cylindrical battery cells due to spatial optimization of the rectangular shape thereof.

The prismatic battery cell 100 includes a rectangular can 104 that may be formed of steel, aluminum, aluminum alloy, plastic, or other metals having sufficient structural strength. The can 104 may be manufactured according to various different methods including deep draw or impact extrusion. The method for manufacturing the can 104 may be combined with wall ironing to achieve the final geometry, thickness and tolerances. The can 104 may be wrapped with cell cover tape.

A jelly roll 106 includes a stacked anode, cathode and separator. A jelly roll 106 type electrode assembly configured to have a structure of a long sheet type cathode and a long sheet type anode to which an active material is applied is wound. At the same time, the stacked-type electrode assembly has a structure in which a separator is disposed between a cathode and an anode or has a structure in which a plurality of cathodes and anodes having a predetermined size are sequentially stacked and a separator is disposed between each of the cathodes and the anode. The jelly roll-type electrode assembly is easy to manufacture and has high unit mass and energy density, compared to a sheet-type electrode assembly. In some batteries, one or more jelly rolls 106 are inserted into can 104. Each jelly roll (electrode assembly) 106 is inserted inside the can 104 while being accommodated in a polymer jelly roll bag 108 or wrapped in a jelly roll sealing tape.

Each jelly roll 106 includes a cathode foil 112 formed of aluminum. The aluminum foil is coated with the electrode slurry. A first operation of electrode manufacturing is a slurry mixing process in which an active raw material is combined with a binder, a solvent and an additive. This mixing process should be performed separately for anode and cathode slurries. Viscosity, density, solids content and other measurable properties of the slurry affect battery quality and electrode uniformity. For example, a slurry having a faster drying rate, a higher solids content, a lower rate capability, and a low viscosity is generated as a solvent content is higher. Thereafter, the cathode slurry is applied to an aluminum foil and dried. A slot die coater is a method of coating a foil in which a slurry is spread through slot gaps on the moving foil receiving tension over rollers. In some embodiments, this may be performed simultaneously on both sides of the foil. This production method enables high speed, while achieving precision in coating thickness. A drying process may be incorporated into a continuous coating. The drying process should achieve three objectives: diffusion of the binder, sedimentation of particles, and evaporation of the solvent. Air floatation is a method of drying the slurry on the foil. Uniformity of the electrode coating and drying process affects the safety, consistency and life cycle of the prismatic battery cell 100. The electrode should go through a calendering process in which electrode porosity and twist are controlled by compressing the coated electrode sheet to a uniform thickness and density.

Each jelly roll 106 includes an anode foil 110 formed of copper foil. The anode foil 110 is provided similarly to a cathode foil 112. Each jelly roll 106 may include a cathode connector (not shown) that makes an electrical connection between the inner end portion of the cathode foil 112 and the cathode terminal 128. Each jelly roll 106 may include an anode connector (not shown) that makes an electrical connection between the inner end portion of the anode foil 110 and an anode terminal 126. Each jelly roll 106 may include a cathode connector mask (e.g., a cathode connector mask 118 in FIG. 3C).

Each prismatic battery cell 100 may have a top cap assembly (upper cap assembly) 120 welded or otherwise bonded to the top of the can 104. The top cap assembly 120 may include a base plate 122 attached to the can 104. The base plate 122 isolates the inside and outside of the cell by welding with the can 104. The base plate 122 may serve as a rigid support structure for elements within the top cap assembly 120. The top cap assembly 120 may include a plurality of top insulators 124 to insulate the base plate 122. The top insulator 124 may prevent leakage of an electrolyte from the prismatic battery cell 100. Additionally, the top insulator 124 may isolate the can 104 from the cathode foil 112 and prevent penetration of moisture and gases from the outside of the cell. A portion of the top insulator 124 may protect a current interrupting device. The top cap assembly 120 includes a cathode terminal 128 electrically connecting the inside and outside of the prismatic battery cell 100. The top cap assembly 120 includes an anode terminal 126 electrically connecting the inside and outside of the prismatic battery cell 100.

The top cap assembly 120 may include a vent cover 130 allowing exhaust gases from the prismatic battery cell 100 to be discharged in a controlled direction and at a controlled pressure. The top cap assembly 120 may include a vent guard 132 protecting the vent cover 130 from the inside of the prismatic battery cell 100 in order to prevent the vent cover 130 from malfunctioning. The top cap assembly 120 may include an overcharge safety device 134 preventing an external current from being introduced using an internal gas pressure of the prismatic battery cell 100. The top insulator 124 may be multi-component. In some embodiments, side portions of the top insulator 124 may be mounted on the edges of the can 104 and the top cap assembly 120. Once the prismatic battery cell 100 is configured, an electrolyte solution may be injected through an electrolyte injection port. An electrolyte cap 138 may close or seal the injection port.

The battery cell 100 may include an insulator 136 located between the top cap assembly 120 and the can 104.

In this document, the electrode assembly of the battery cell 100 is described as the jelly roll 106, but the electrode assembly of the battery cell 100 is not limited to the jelly roll 106. For example, the jelly roll 106 may be replaced with a stack type electrode assembly or a Z-folding type electrode assembly. According to an embodiment, the jelly roll 106 described herein may refer to an electrode assembly.

In this document, the can 104 may be referred to as a case or housing.

Figure 2A:
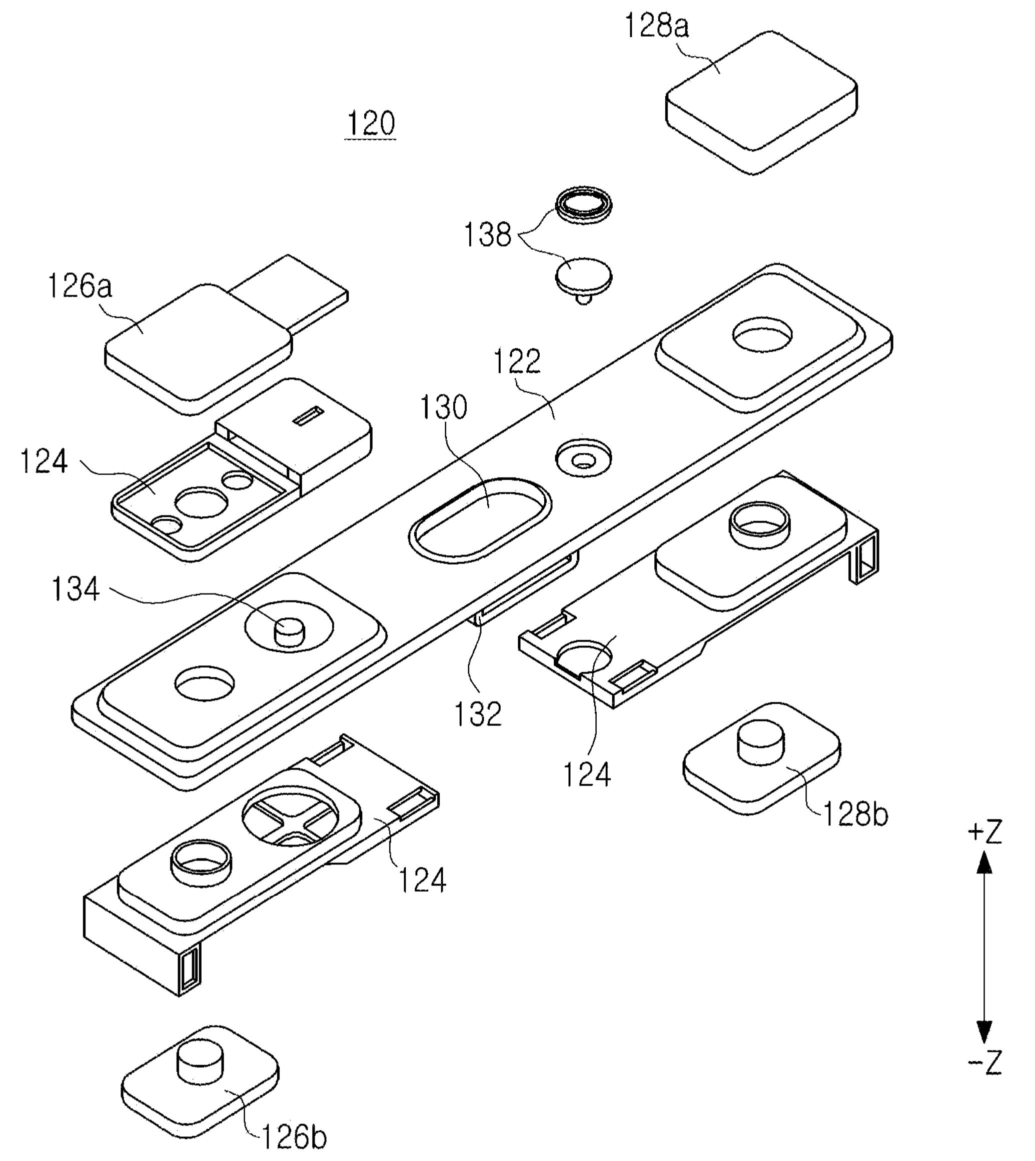
FIGS. 2A, 2B, and 2C are views for illustrating a top cap assembly according to one embodiment.
Figure 2B:
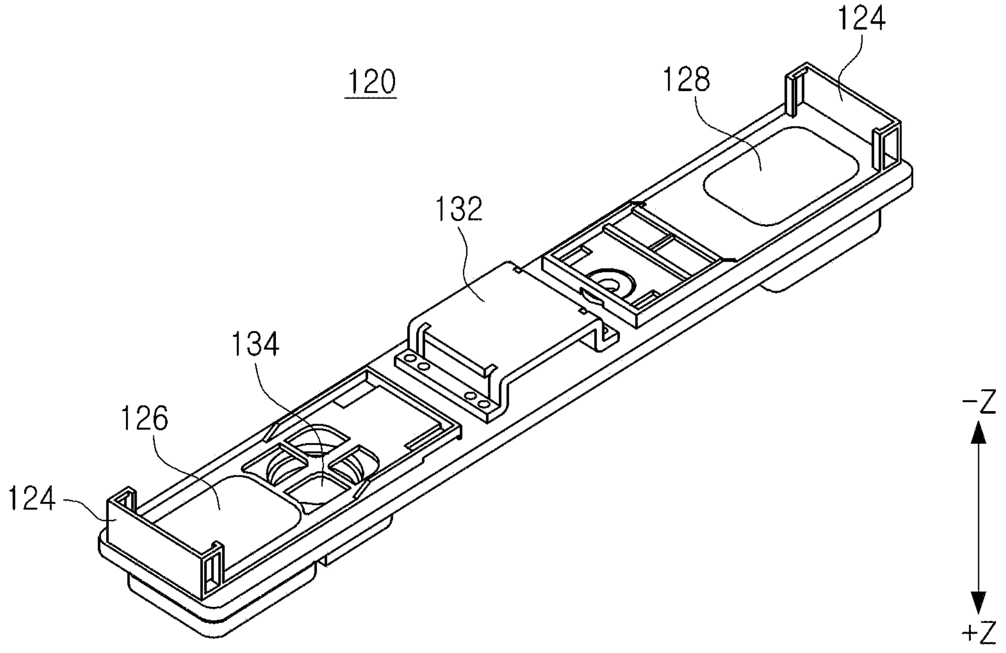
Figure 2C:
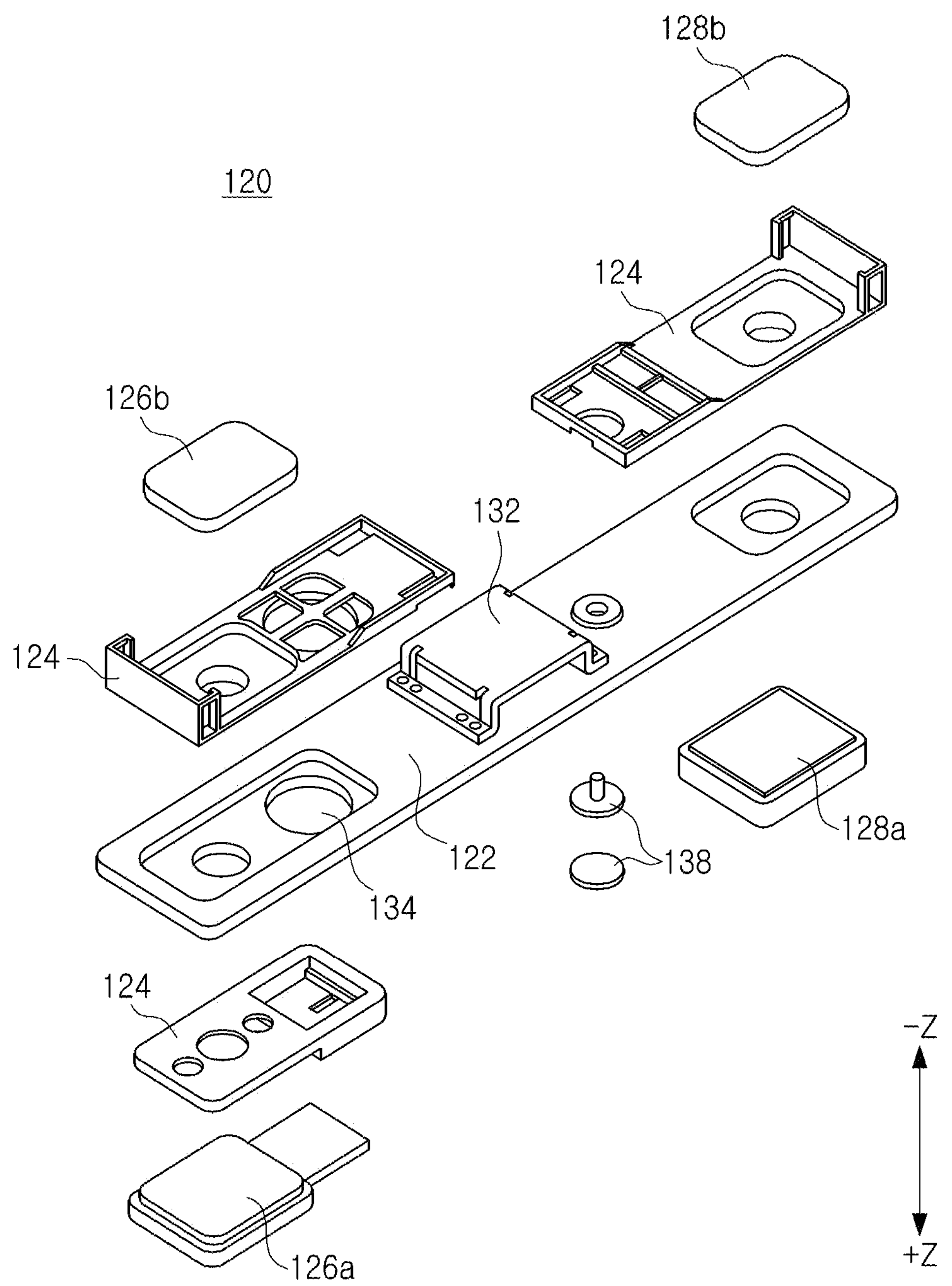

FIGS. 2A, 2B and 2C show a configuration and component functions of the top cap assembly 120. For example, FIG. 2A is an exploded perspective view of the top cap assembly 120 according to an embodiment of the present disclosure. FIG. 2B is a rear perspective view of the top cap assembly 120 according to an embodiment of the present disclosure. Description of the top cap assembly 120 of FIG. 1 may be applied to the top cap assembly 120 of FIGS. 2A, 2B and 2C.

The top cap assembly 120 serving as a cover for the prismatic battery cell 100 is a complex assembly including a plurality of welded components. Adhesives may be used instead of welding specific components.

The prismatic battery cell 100 may include the vent cover 130. The vent cover 130 provides overpressure alleviation when temperature and corresponding pressure increase in the prismatic battery cell 100. For example, the vent cover 130 may be activated in a preset pressure range. The vent cover 130 may be laser-welded to the top cap assembly 120.

The prismatic battery cell 100 may include the can 104. The can 104 may generally be formed of deep-drawn aluminum or stainless steel to prevent moisture from entering the cell, while providing diffusion resistance to organic solvents, such as liquid electrolytes. The most important reason the can 104 is typically formed of deep-drawn aluminum alloy or stainless steel is to reduce a welding point to improve the mechanical strength of the can 104. The electrolyte may be filled in the prismatic battery cell 100 through an injection port. After the electrolyte is filled, the injection port may be closed or sealed by an electrolyte cap 138. After electrolyte filling, the electrolyte cap 138 may be welded to the top cap assembly 120 or a locking ball (not shown) may be forced into the injection port. The cell may have an overcharge safety device 134 that may disconnect current flow when high internal pressure is reached in the prismatic battery cell 100. A rise in pressure is usually a result of high temperatures.

According to an embodiment, the cathode terminal 128 may be provided in plural. For example, the cathode terminal 128 may include a first cathode terminal 128*a* in which at least a portion is exposed to the outside of the battery cell 100 and a second cathode terminal 128*b* connected to a cathode foil (e.g., the cathode foil 112 of FIG. 1). The second cathode terminal 128*b* may be electrically connected to the first cathode terminal 128*a*. For example, a portion of the second cathode terminal 128*b* may contact the first cathode terminal 128*a*.

According to an embodiment, the anode terminal 126 may be provided in plural. For example, the anode terminal 126 may include a first anode terminal 126*a* in which at least a portion is exposed to the outside of the battery cell 100 and a second anode terminal 126*b* connected to an anode foil (e.g., the anode foil 110 of FIG. 1). The second anode terminal 126*b* may be electrically connected to the first anode terminal 126*a*. For example, a portion of the second anode terminal 126*b* may contact the first anode terminal 126*a*.

FIGS. 3A to 3F are a view illustrating an assembly process of a top cap assembly and an electrode assembly according to an embodiment. A battery cell manufacturing process 300 may include an assembly process of the top cap assembly 120 and the jelly roll 106.

Figures 3A, 3B, 3C, 3D, 3E, 3F:
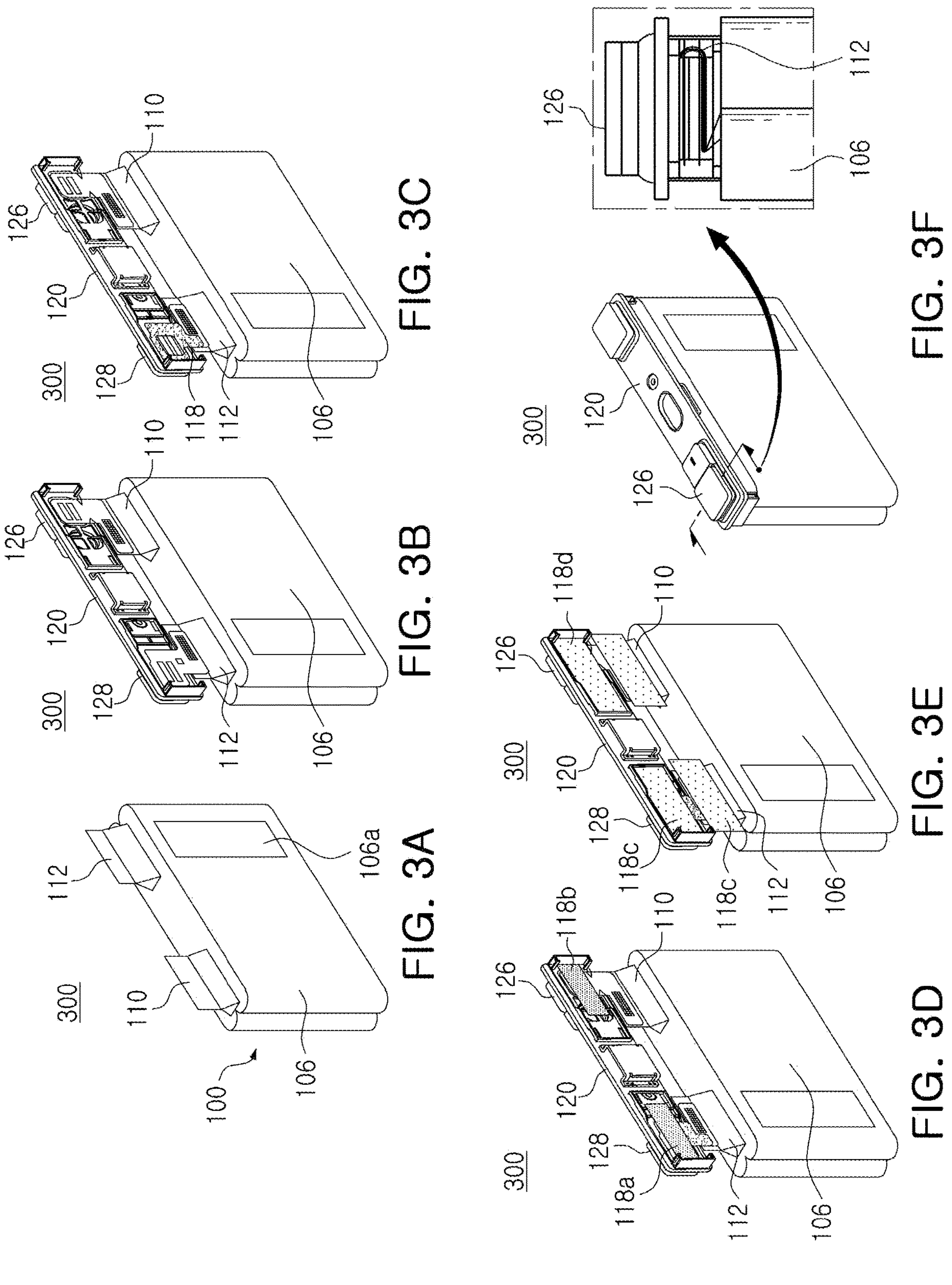
FIGS. 3A to 3F are a view for illustrating an assembly process of a top cap assembly and an electrode assembly according to one embodiment.

Referring to FIG. 3A, a sealing tape 106*a* may be attached to the jelly roll 106. According to an embodiment, the sealing tape 106*a* can cover at least a portion of the jelly roll 106. According to an embodiment, the sealing tape 106*a* may seal a portion of the jelly roll 106.

Referring to FIG. 3B, the jelly roll 106 may be connected to the top cap assembly 120. For example, a connection component for connecting the jelly roll 106 and the top cap assembly 120 may be prepared. The top cap assembly 120 may be closely attached to the jelly roll 106 using the connection component. For example, the cathode terminal 128 of the top cap assembly 120 may be connected to the cathode foil 112 of the jelly roll 106, and the anode terminal 126 of the top cap assembly 120 may be connected to the jelly roll 106. The cathode terminal 128 may be welded to the cathode foil 112 and the anode terminal 126 may be welded (e.g., ultrasonic-welded) to the anode foil 110.

Referring to FIG. 3C, at least a portion of the cathode terminal 128 may be masked. For example, the cathode connector mask 118 may be disposed to cover a portion of the cathode terminal 128. The cathode connector mask 118 may protect the cathode terminal 128. Although not shown, the description of the masking of the cathode terminal 128 may be applied to the anode terminal 126 as well.

Referring to FIG. 3D and/or FIG. 3E, tape may be attached to at least a portion of the cathode terminal 128 and the anode terminal 126. For example, the battery cell 100 may include welding tapes 118*a*, 118*b*, 118*c*, and 118*d* attached to at least a portion of the cathode terminal 128, the anode terminal 126, the cathode foil 112, and/or the anode foil 110. According to an embodiment, the welding tapes 118*a*, 118*b*, 118*c*, 118*d* may be attached to at least a portion of a joint portion of the cathode terminal 128, the anode terminal 126, the cathode foil 112, and/or the anode foil 110. As the joint portion is covered with the welding tapes 118*a*, 118*b*, 118*c*, and 118*d*, the cathode terminal 128 and the anode terminal 126 may be protected.

Referring to FIG. 3F, the anode foil 110 connected to the anode terminal 126 may be folded. For example, when the top cap assembly 120 is disposed on the jelly roll 106, at least a portion of the anode foil 110 may be folded. Although not shown, when the top cap assembly 120 is placed on the jelly roll 106, the cathode foil 112 may also be folded.

FIGS. 4A to 4F are a view illustrating an assembly process of an electrode assembly, a jelly roll bag, and a can. A battery cell manufacturing process 400 may include an assembly process of the jelly roll 106, the jelly roll bag 108, and the can 104.

Figure 4A:
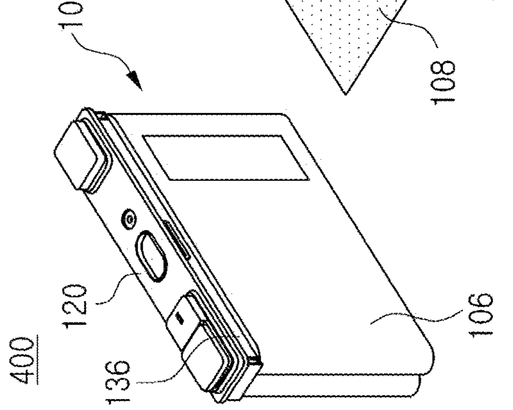
FIGS. 4A to 4F are a view for illustrating an assembly process of an electrode assembly, a jelly roll bag, and a can according to one embodiment.

Referring to FIG. 4A, an insulator 136 may be installed on the battery cell 100. For example, the insulator 136 may be disposed between the can 104 and the cap assembly 120.

Figure 4B:
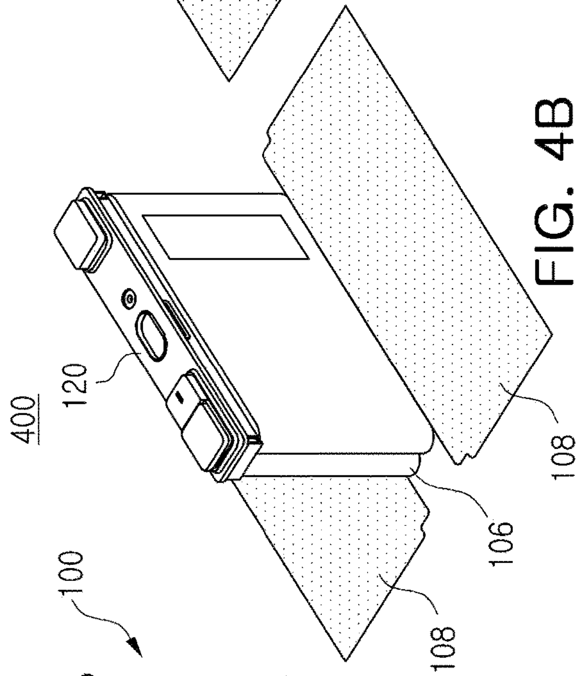

Referring to FIG. 4B, the jelly roll bag 108 may be prepared. The jelly roll bag 108 may cover at least a portion (e.g., a side surface) of the jelly roll 106. The jelly roll 106 may be surrounded by the jelly roll bag 108. The jelly roll bag 108 may protect the jelly roll 106 from external impact. In FIG. 4B, a structure in which the jelly roll bag 108 is disposed on two side surfaces of the jelly roll 106 is shown, but the structure of the jelly roll bag 108 is not limited thereto. For example, according to an embodiment, the jelly roll bag 108 may be formed to cover four side surfaces of the jelly roll 106.

Figure 4C:
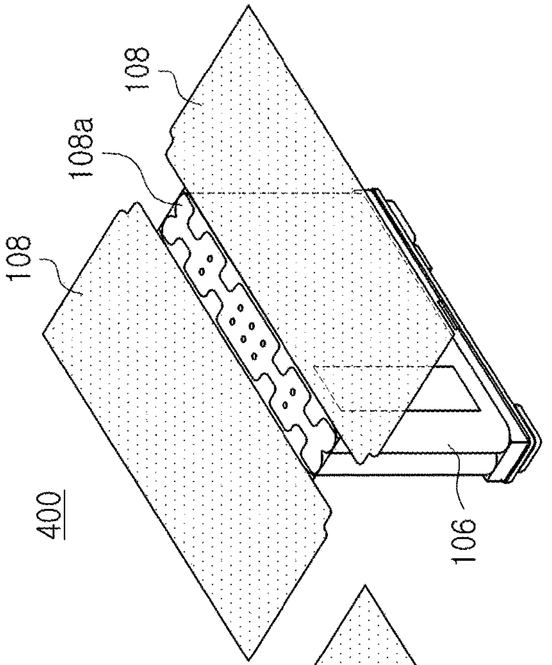

Referring to FIG. 4C, an insulator 108*a* may be attached to the jelly roll 106. According to an embodiment, in a state in which the jelly roll bag 108 is unfolded, the insulator 108*a* may be attached to a lower portion of the jelly roll 106. The insulator 108*a* may be referred to as a lower insulator.

Figure 4D:
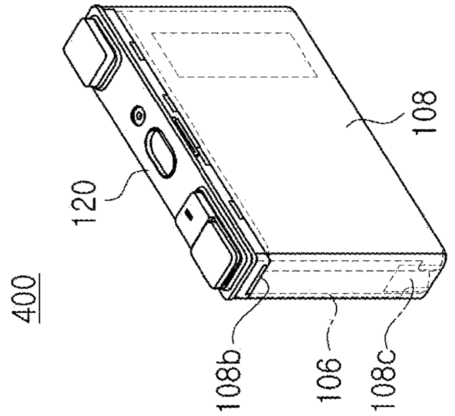

Referring to FIG. 4D, at least some of the components of the battery cell 100 may be taped. For example, the battery cell 100 may include the top cap assembly 120, the can 104, and/or at least one first tape 108*b* attached onto insulator 136, and/or a second tape 108*c* attached to a lower portion of the jelly roll bag 108 along a side portion of the insulator 136.

Figure 4E:
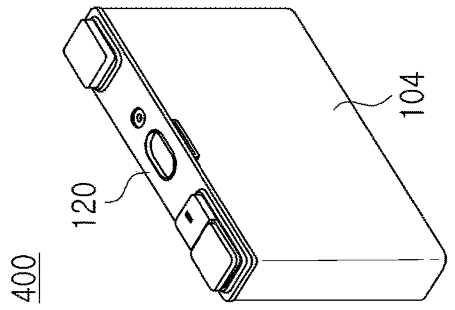

Referring to FIG. 4E, the jelly roll 106 may be inserted into the can 104. The jelly roll 106 and/or the jelly roll bag 108 may be inserted into the can 104.

According to an embodiment, the battery cell manufacturing process 400 may include a wetting process of the jelly roll 106. For example, the jelly roll 106 may be initially wetted by an electrolyte delivered through an electrolyte injection port. For example, partial vacuum may be formed in the prismatic battery cell 100, and a predetermined amount of electrolyte may be injected through the electrolyte injection port. The partial vacuum may improve the distribution and wetting of all layers within the jelly roll 106. Wetting of all layers within the jelly roll 106 may require a rolling or spinning protocol to enhance wetting.

According to an embodiment, the battery cell manufacturing process 400 may include a quality check process for the initial wetting process, such as checking a weight of the prismatic battery cell 100 immediately after charging. For example, a second electrolyte charging operation in which an electrolyte is charged to achieve a desired weight may be applied to the battery cell. According to an embodiment, the battery cell manufacturing process 400 may include a pre-formation process of charging the prismatic battery cell 100 and discharging gas.

Figure 4F:
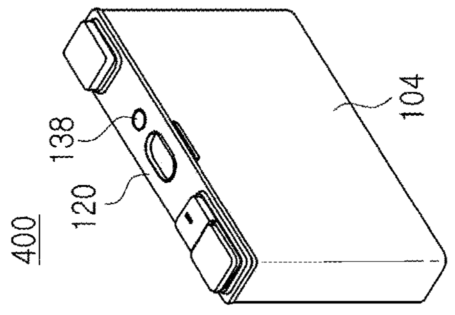

Referring to FIG. 4F, the electrolyte injection port may be sealed. For example, the electrolyte cap 138 may be inserted into the electrolyte injection port.

Figure 5A:
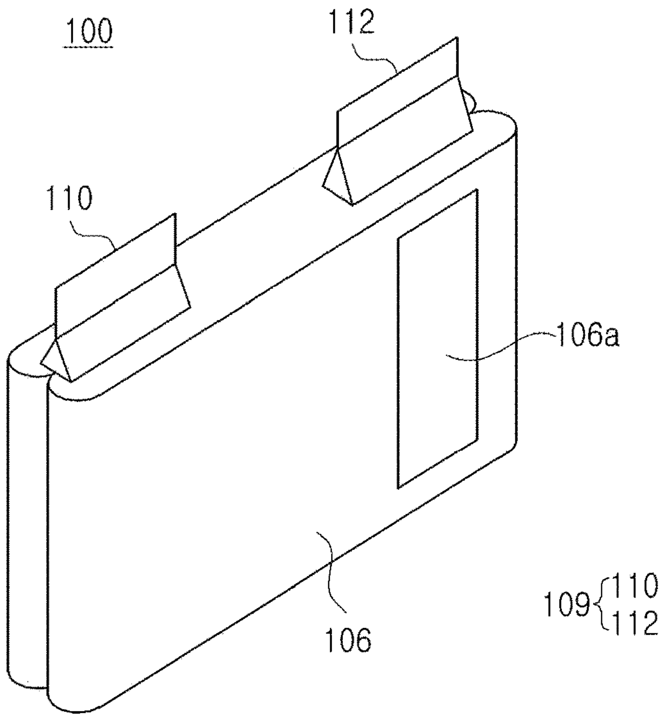
FIG. 5A is a perspective view of an electrode assembly including an electrode foil, according to one embodiment.
Figure 5B:
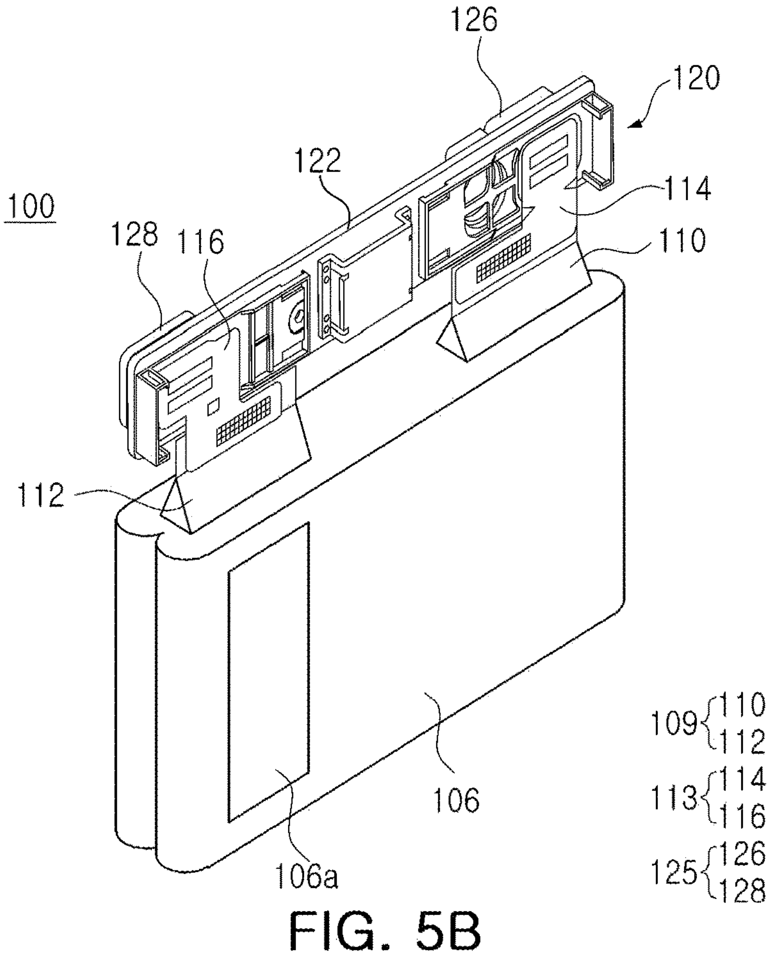
FIG. 5B is a perspective view illustrating a connection between an electrode foil and an electrode terminal on a top cap assembly, according to one embodiment.

FIG. 5A is a perspective view of an electrode assembly 106 including an electrode foil 109, according to one embodiment. FIG. 5B is a perspective view illustrating a connection between an electrode foil 109 and an electrode terminal 125 on a top cap assembly 120, according to one embodiment.

Referring to FIGS. 5A and 5B, a battery cell 100 may include jelly roll 106 and/or top cap assembly 120. The jelly roll 106 may be an example of an electrode assembly. Hereinafter, in this document and claims, the electrode assembly will be described using a jelly roll as an example, and is denoted by the same reference numeral "106."

FIG. 5A is a perspective view of an electrode assembly 106 including an electrode foil 109. The electrode foil 109 may include an anode foil 110 and a cathode foil 112. A sealing tape 106*a*, covering at least a portion of the electrode assembly 106, may be affixed to an outer surface of the electrode assembly 106.

FIG. 5B is a perspective view illustrating a connection between the electrode foil 109 and the electrode terminal 125 on a top cap assembly 120. The top cap assembly 120 may include a cap plate 122 and the electrode terminal 125. The electrode terminal 125 may include an anode terminal 126 and a cathode terminal 128. The electrode terminal 125 may be connected to the electrode foil 109. For example, the cathode foil 112 may be electrically connected to the cathode terminal 128, and the anode foil 110 may be electrically connected to the anode terminal 126. The electrode terminal 125 may be connected to the electrode foil 109 through a current collector 113. The current collector 113 may include an anode connector 114 and a cathode connector 116. The anode foil 110 may be connected to the anode terminal 126 (for example, the second anode terminal 126*b* in FIG. 2C) through the anode connector 114. The anode foil 110 and the anode connector 114 may be coupled to each other by welding (for example, ultrasonic welding or the like). The cathode foil 112 may be connected to the cathode terminal 128 (for example, the second cathode terminal 128*b* in FIG. 2C) through the cathode connector 116. The cathode foil 112 and the cathode connector 116 may be coupled to each other by welding (for example, ultrasonic welding or the like).

Figure 6A:
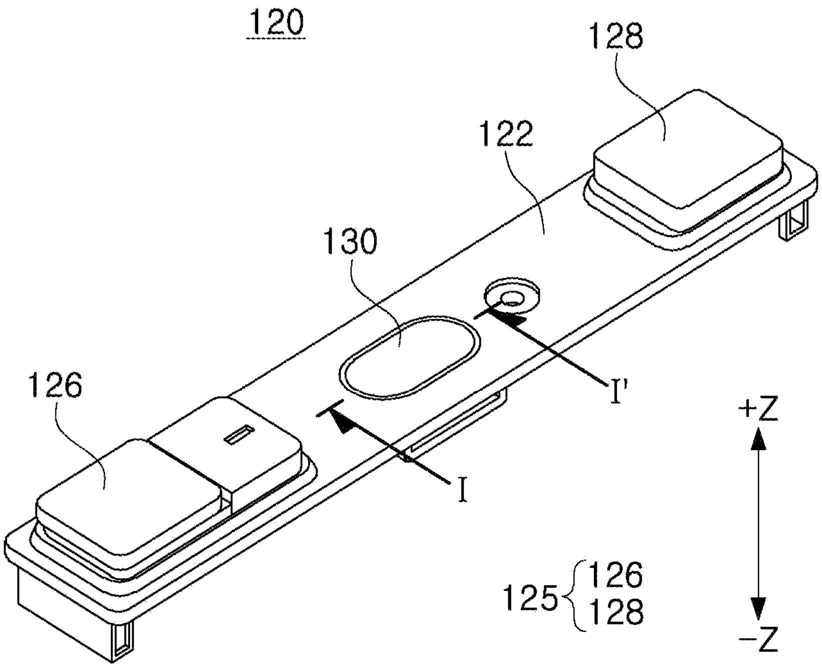
FIGS. 6A and 6B are perspective views of a top cap assembly according to one embodiment.
Figure 6B:
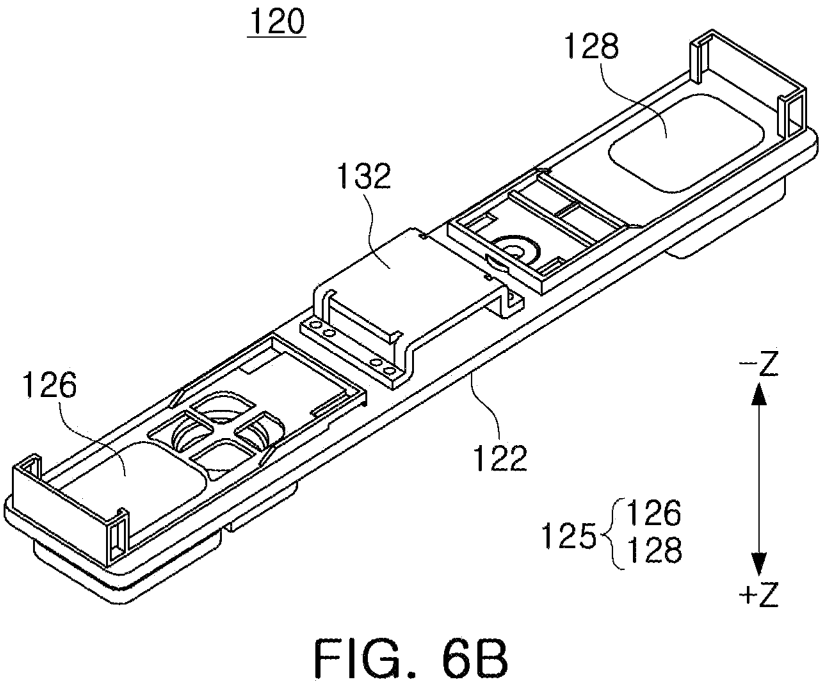

FIGS. 6A and 6B are perspective views of a top cap assembly according to one embodiment, and FIG. 6A is a perspective view viewed from above and FIG. 6B is a perspective view viewed from below.

Referring to FIGS. 6A and 6B, a top cap assembly 120 may include a cap plate 122 attached to a can (case) 104. An electrode terminal 125 and a vent cover 130 may be disposed on the cap plate 122. The electrode terminal 125 may be electrically connected to the electrode assembly 106 (see FIG. 5A), and may include an anode terminal 126 and a cathode terminal 128.

The vent cover 130 may discharge gas generated inside the case 104 to the outside when pressure inside the case 104 is equal to or higher than a predetermined pressure. A high-pressure gas may be discharged to the outside of a battery cell 100 through the vent cover 130. The vent cover 130 may be disposed on the cap plate 122. For example, the vent cover 130 may be disposed on the cap plate 122 between the anode terminal 126 and the cathode terminal 128. Alternatively, the vent cover 130 may be disposed in the case 104, and may be disposed in both the cap plate 122 and the case 104. At least one vent cover 130 may be disposed in the battery cell 100.

A vent guard 132 may protect the vent cover 130 to prevent malfunction of the vent cover 130. The vent guard 132 may be disposed in a position facing the vent cover 130. The vent guard 132 may be attached to a lower surface of the cap plate 122. The vent guard 132 is a small metal bracket inside the vent cover 130 for preventing someone from accidentally or intentionally placing an object in the vent cover 130 and potentially damaging a portion of a jelly roll 106.

Figure 7A:
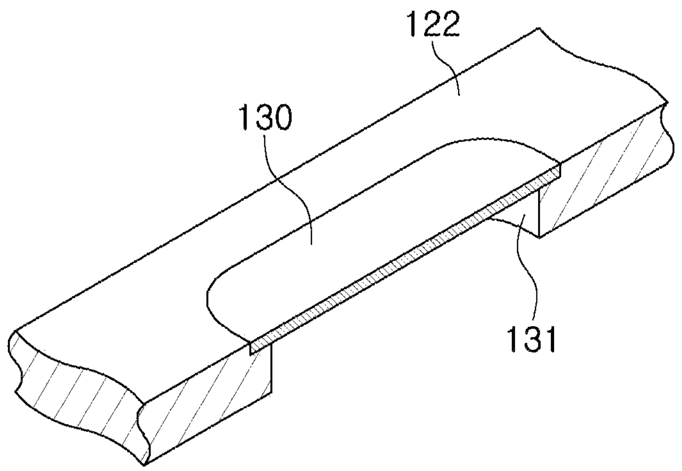
FIGS. 7A to 7D are views illustrating a vent cover according to one embodiment.
Figure 7B:
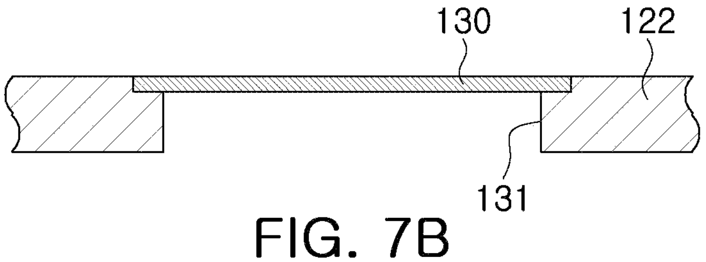
Figure 7C:
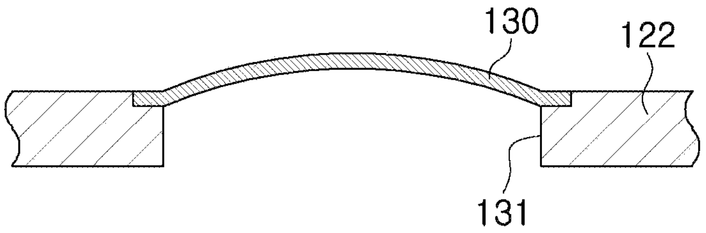
Figure 7D:
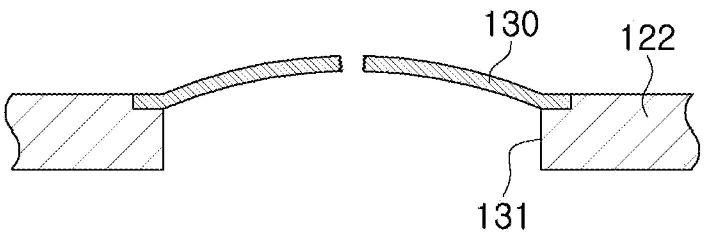

FIGS. 7A to 7D are views illustrating a vent cover 130 according to one embodiment. FIG. 7A is a cross-sectional perspective views taken along line I-I' in FIG. 6A. FIG. 7B is a cross-sectional view illustrating a state before a vent cover 130 is deformed. FIG. 7C is a cross-sectional view illustrating a state in which the vent cover 130 is expanded or inflated, and FIG. 7D is a state in which the vent cover 130 is broken.

As illustrated in FIG. 7A, the vent cover 130 may be disposed on a cap plate 122. A venting hole 131 configured to discharge gas generated in the case 104 may be formed in the cap plate 122. The vent cover 130 may be disposed in the venting hole 131 to open the venting hole 131 when the pressure in the case 104 is equal to or higher than a set pressure. The vent cover 130 may have a material, shape, or structure bursting at a set pressure or higher. For example, the vent cover 130 may be formed of a thin and flexible material such as metal foil. The vent cover 130 may include a groove-shaped weakness part having a relatively small thickness so as to burst at a set pressure or higher.

The vent cover 130 may be disposed in the venting hole 131. In the cap plate 122, a step-shaped seating part may be formed around the venting hole 131, and the vent cover 130 may be disposed on the seating part. The vent cover 130 may have a slightly larger size than that of the venting hole 131 so as to cover the venting hole 131. The vent cover 130 may be formed of a thin breakable material which may be cut when a critical pressure is reached. The vent cover 130 may be fixed around the venting hole 131 by welding such as ultrasonic welding. Alternatively, the vent cover 130 may be fixed using an adhesive such as tape or glue designed to withstand a high pressure greater than the bursting pressure of the vent cover 130. That is, the tape or adhesive may have sufficient adhesive strength such that the vent cover 130 may not be separated from the venting hole 131 before the vent cover 130 bursts. In another embodiment, the cap plate 122 may be manufactured by coin stamping.

FIG. 7B illustrates a cross-section of the vent cover 130 disposed in the venting hole 131 while the battery cell 100 exhibits a normal internal pressure.

FIG. 7C illustrates a cross-section of the vent cover 130 disposed in the venting hole 131 while the battery cell 100 exhibits a higher internal pressure than in FIG. 7B. The vent cover 130 may bulge under increased internal cell pressure. That is, when the pressure in the case 104 increases, the vent cover 130 may swell toward the external side of the cap plate 122 or may have an expanded shape.

FIG. 7D illustrates a cross-section of the vent cover 130 disposed in the venting hole 131 at a higher internal pressure than FIG. 7C. The vent cover 130 may burst or may break or cut due to an increase in internal pressure.

Figure 8A:
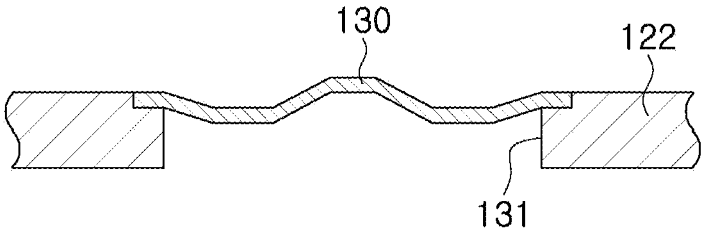
FIGS. 8A, 8B, and 8C are views illustrating a modified example of a vent cover.
Figure 8B:
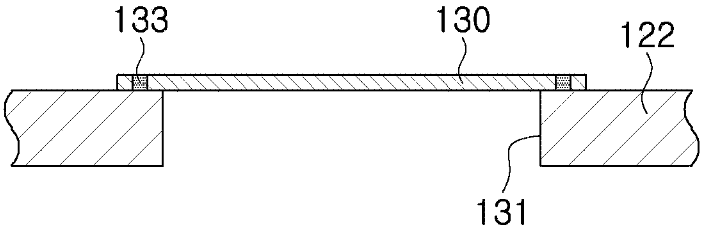
Figure 8C:
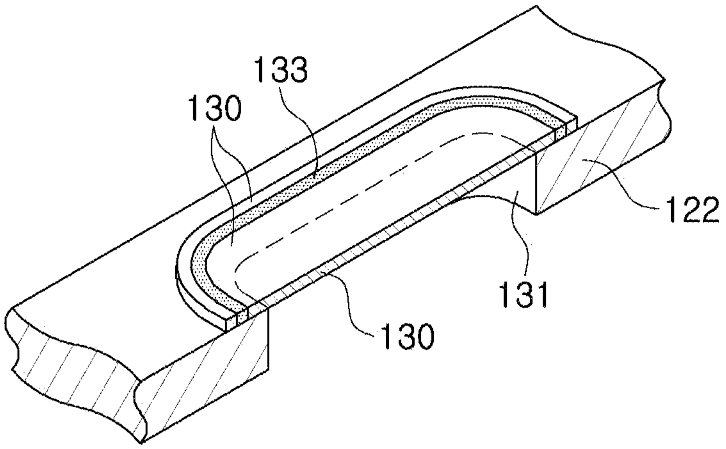

FIGS. 8A, 8B, and 8C are views illustrating a modified example of a vent cover. FIG. 8A is a cross-sectional view illustrating a first modified example of a vent cover, FIG. 8B is a cross-sectional view illustrating a second modified example of a vent cover, and FIG. 8C is a cross-sectional perspective view illustrating a portion of the vent cover illustrated in FIG. 8B.

As illustrated in FIG. 8A, the vent cover 130 may have a curved shape. The vent cover 130 having the curved shape may be disposed on a step-shaped seating part formed on the cap plate 122.

As illustrated in FIGS. 8B and 8C, the vent cover 130 may be attached to an upper surface of the cap plate 122 while covering the venting hole 131. The vent cover 130 may have a size larger than that of the venting hole 131 and may be fixed to the cap plate 122 by ultrasonic welding or the like. The vent cover 130 and the cap plate 122 may be welded along the welding line 133. Alternatively, the vent cover 130 and the cap plate 122 may be fixed using an adhesive such as tape or glue designed to withstand a high pressure greater than the bursting pressure of the vent cover 130.

Figure 9:
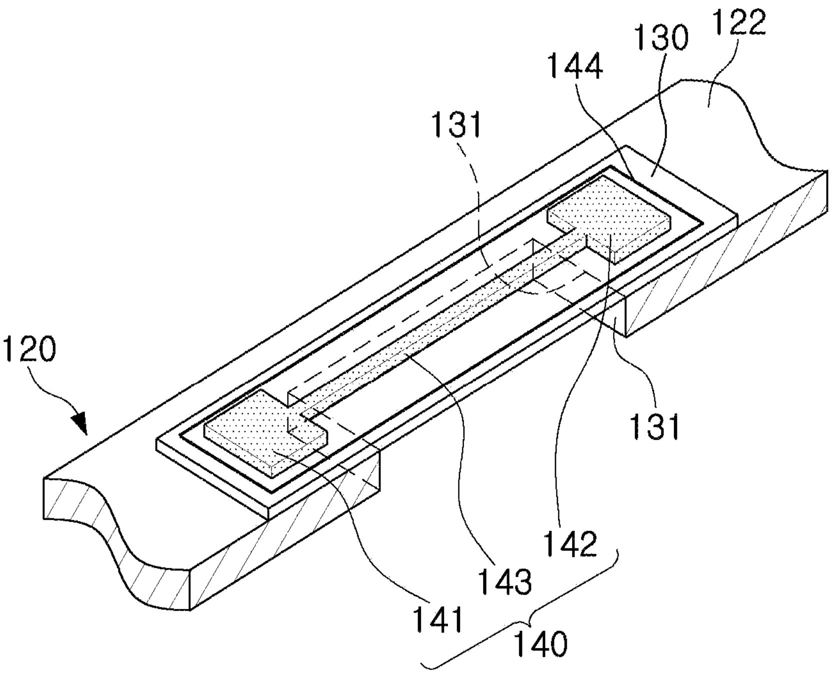
FIG. 9 is a perspective view of a normally closed vent fuse according to one embodiment.

FIG. 9 is a perspective view of a normally closed vent fuse according to one embodiment.

Referring to FIG. 9, a top cap assembly 120 may include a cap plate 122, and the cap plate 122 may be provided with a venting hole 131. A vent cover 130 may cover the venting hole 131. A vent fuse 140 may be disposed on the vent cover 130. In FIG. 9, the venting hole 131 and the vent cover 130 are illustrated as having a rectangular shape, but shapes of the venting hole 131 and the vent cover 130 may be changed in various manners. The vent fuse 140 may be attached to an external surface of the vent cover 130 and may be disposed to cover at least a portion of the vent cover 130. The vent fuse 140 may be attached to the vent cover 130 across the vent cover 130.

The vent fuse 140 may operate to block current flow between an electrode terminal 125 and the outside by discharging gas through the vent cover 130 or by deforming the vent cover 130. The vent fuse 140 may be electrically connected to the electrode terminal 125 (see FIG. 16). The vent fuse 140 may be electrically connected to a circuit part 160 of FIG. 16.

When the pressure inside a case 104 increases, the vent cover 130 may be deformed as illustrated in FIGS. 7C and 7D. For example, when the pressure inside the case 104 increases, the vent cover 130 may be deformed to have an inflated or expanded shape in an external direction of the cap plate 122, as illustrated in FIG. 7C. Furthermore, when the pressure inside the case 104 is equal to or greater than a predetermined pressure, the vent cover 130 may be deformed in a form of bursting or in a form of breaking or cutting as illustrated in 7*d*. The vent fuse 140 may be provided as a normally closed vent fuse that is burst or broken by deforming the vent cover 130.

The normally closed vent fuse 140 may include a fuse part 143 disposed on the vent cover 130, and a first terminal 141 and a second terminal 142 disposed at both ends of the fuse part 143. The normally closed vent fuse 140 may allow an electrical connection between the first terminal 141 and the second terminal 142 in a normal first state, and may block an electrical connection between the first terminal 141 and the second terminal 142 in an activated second state. The first terminal 141 may be disposed on one side of the fuse part 143, and the second terminal 142 may be disposed on the other side of the fuse part 143. The first terminal 141 may be electrically connected to the electrode terminal 125. The second terminal 142 may be electrically connected to a circuit part 160 (see FIG. 16) described below.

The fuse part 143 may be disconnected by discharging gas through the vent cover 130 or by deforming the vent cover 130. For example, the fuse part 143 may be broken by bursting or breaking the vent cover 130. The fuse part 143 may allow current flow between the first terminal 141 and the second terminal 142 in a normal (first) state, and may block current flow between the first terminal 141 and the second terminal 142 in a state in which the fuse part 143 is activated (i.e., broken). When the normally closed fuse 140 is switched to an open (second) state, a battery management system (e.g., a controller 20 of FIG. 19) can detect defects in a battery cell 100.

The fuse part 143 may include a conductive metal foil. The electrically conductive fuse part 143 may be disposed on the vent cover 130 in a state in which it is electrically insulated from the vent cover 130 and/or the cap plate 122.

The fuse part 143 may be attached to the vent cover 130 to cross the vent cover 130. In this case, the fuse part 143 may be attached to the vent cover 130 while being coupled to a substrate 144. The substrate 144 may be formed of a deformable material such as a tape. The substrate 144 may be formed of an electrically insulating material to provide electrical insulation between the normally closed vent fuse 140 and the vent cover 130 or between the normally closed vent fuse 140 and the cap plate 122. The substrate 144 may have an adhesive property so as to be attached to the vent cover 130. The first terminal 141 and the second terminal 142 may also be disposed on the substrate 144.

Figure 10:
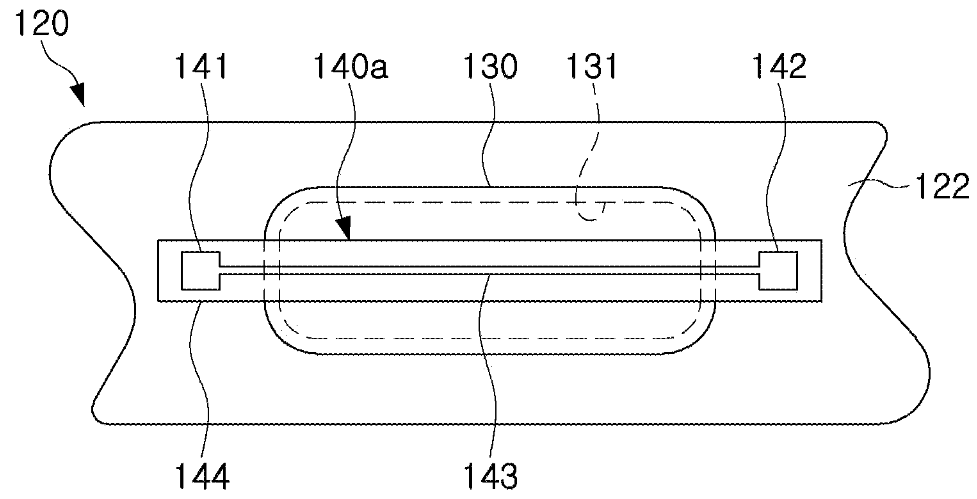
FIG. 10 is a schematic view of a normally closed vent fuse according to another embodiment.

FIG. 10 is a schematic view of a normally closed vent fuse 140*a* according to another embodiment.

A normally closed vent fuse 140*a* illustrated in FIG. 10 may include a first terminal 141, a second terminal 142, and a fuse part 143. The fuse part 143 may include a conductive metal foil. The fuse part 143 may be disposed on a vent cover 130 while being coupled on a substrate 144. The substrate 144 may have electrical insulation or adhesion. The fuse part 143 may be attached to the vent cover 130 through the substrate 144.

The vent cover 130 may also be disposed on the vent cover 130 in a form of crossing a venting hole 131. The vent cover 130 may be deformed in a form of bursting or in a form of breaking or cutting, as illustrated in FIG. 7D, when pressure inside a case 104 is equal to or greater than a predetermined pressure. When the vent cover 130 is burst or broken, the venting hole 131 may be opened, and accordingly, gas inside a battery cell 100 may be discharged through the venting hole 131. At least a portion of the fuse part 143 of the normally closed vent fuse 140*a* may be melted and disconnected by a discharge of high-temperature gas through the venting hole 131. The substrate 144 may also be melted by the discharge of high-temperature gas.

The fuse part 143 may be formed of a material having a melting temperature threshold value corresponding to an upper limit of a safe operating temperature of the battery cell 100. When a temperature of the gas discharged through the venting hole 131 exceeds the melting temperature threshold, the normally closed fuse 140*a* may become an open circuit. When the normally closed fuse 140*a* is switched to an open state, a battery management system may detect defects in the battery cell.

Figure 11:
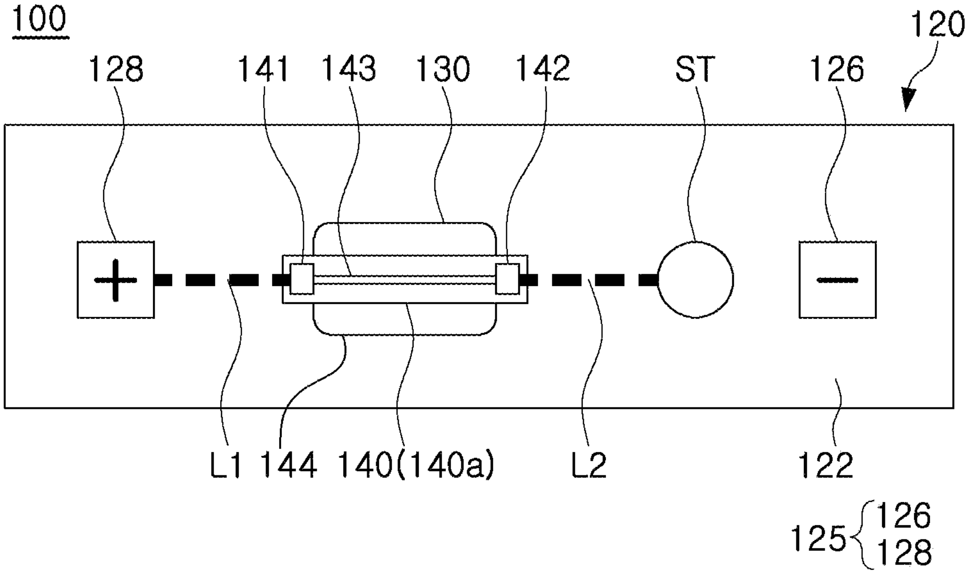
FIG. 11 is a schematic view illustrating an installation state of a normally closed vent fuse.

FIG. 11 is a schematic view illustrating an installation state of normally closed vent fuses 140 and 140*a*.

A cathode terminal 128, an anode terminal 126, a vent cover 130, and a normally closed vent fuses 140 and 140*a* may be disposed on a cap plate 122 of a top cap assembly 120. The normally closed vent fuses 140 and 140*a* may be disposed to cross the vent cover 130. The normally vent-type vent fuses 140 and 140*a* may include a fuse part 143 including a conductive metal foil. The fuse part 143 may be disposed on a substrate 144 such as a tape. A first terminal 141 and a second terminal 142 may be disposed in both ends of the fuse part 143. The fuse part 143 may be electrically connected to at least one of electrode terminals 125. For example, the fuse part 143 may be electrically connected to the cathode terminal 128 through the first terminal 141. The first terminal 141 and the cathode terminal 128 may be connected through a first conductive path L1. The fuse part 143 may be connected to a battery management system (e.g., a controller 20 of FIG. 19). For example, the fuse part 143 may be electrically connected to a signal terminal ST transmitting a signal to the battery management system through the second terminal 142. The second terminal 142 and the signal terminal ST may be electrically connected to each other through a second conductive path L2. FIG. 11 illustrates that the signal terminal ST is disposed on the cap plate 122, but the signal terminal ST may be disposed outside a battery cell 100.

In this embodiment, the cathode terminal 128 may be connected to the signal terminal ST through the first conductive path L1, the first terminal 141, the fuse part 143, the second terminal 142, and the second conductive path L2, and the signal terminal ST may be electrically connected to the battery management system. The connection may allow the signal terminal ST to measure a voltage at the cathode terminal 128 and communicate with the battery management system with measured results. When the pressure or temperature of the battery cell exceeds a threshold value of the normally closed vent fuses 140 and 140*a*, the fuse part 143 may be disconnected, through which it may be known that the battery management system has defects in the battery cell 100.

Meanwhile, FIG. 11 illustrates one embodiment in which the normally closed vent fuses 140 and 140*a* are connected to the battery management system through the signal terminal ST. However, normally open vent fuses 150 and 150*a* described below in FIGS. 12 to 15B may also be connected to the battery management system through the signal terminal ST.

Figure 12:
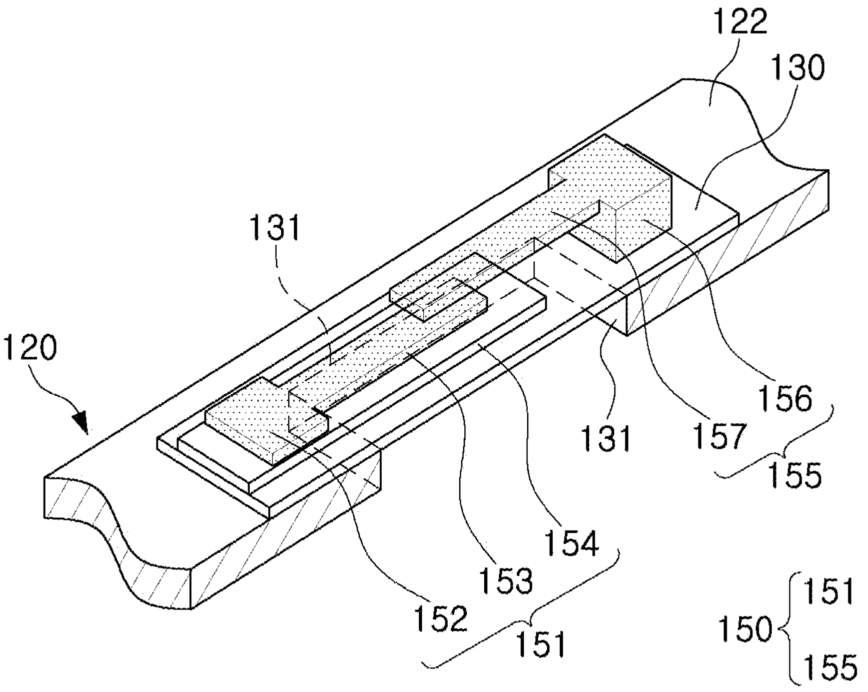
FIG. 12 is a perspective view of a normally open vent fuse according to one embodiment.

FIG. 12 is a perspective view of a normally open vent fuse 150 according to one embodiment.

Referring to FIG. 12, a top cap assembly 120 may include a cap plate 122, and the cap plate 122 may be provided with a venting hole 131. A vent cover 130 may cover the venting hole 131. The vent fuse 150 may be disposed on the vent cover 130. The vent fuse 150 may be installed on an external surface of the vent cover 130 across the vent cover 130.

The vent fuse 150 may operate to block current flow between an electrode terminal 125 and the outside by deforming the vent cover 130. The vent fuse 150 may be electrically connected to the electrode terminal 125 (see FIG. 17). The vent fuse 150 may be electrically connected to a circuit part 170 (see FIG. 17A). When pressure inside a case 104 increases, the vent cover 130 may be deformed as illustrated in FIG. 7C. For example, when the pressure inside the case 104 increases, the vent cover 130 may be deformed to have an inflated or expanded shape in an external direction of the cap plate 122, as illustrated in FIG. 7C. A vent fuse 150 may be provided as a normally open vent fuse.

A normally open vent fuse 150 may include a movable fuse part 151 and a fixed fuse part 155. The movable fuse part 151 and the fixed fuse part 155 may have a position in which they are spaced apart from each other in a normal first state, and may be in contact with each other in an activated second state.

At least a portion of the movable fuse part 151 may be attached to the vent cover 130 and may move an external direction of the cap plate 122 by deforming the vent cover 130. The movable fuse part 151 may include a first terminal 152 disposed on the vent cover 130 or the cap plate 122, and a movable part 153 disposed on the vent cover 130. The movable part 153 may be attached to the vent cover 130 and may be moved an external direction of the cap plate 122 by deforming the vent cover 130. The first terminal 152 and the movable part 153 may be attached to the cap plate 122 or the vent cover 130 while being coupled to a substrate 154. The substrate 154 may be formed of a deformable material such as a tape. The substrate 154 may be formed of an electrically insulating material to provide electrical insulation between the movable fuse part 151 and the vent cover 130 or between the movable fuse part 151 and the cap plate 122. The substrate 154 may have an adhesive property so as to be attached to the cap plate 122 or the vent cover 130.

The fixed fuse part 155 may be disposed while being fixed to the vent cover 130 or the cap plate 122 so as to come into contact with the movable fuse part 151 by deforming the movable fuse part 151. The fixed fuse part 155 may be disposed while being fixed to the cap plate 122 so as to have a position spaced apart from the movable fuse part 151 in a normal first state. The fixed fuse part 155 may be in contact with the movable fuse part 151 by deforming the movable fuse part 151 in an activated second state.

The fixed fuse part 155 may include a fixed part 157 and a second terminal 156. The fixed part 157 may have a position spaced apart from the movable fuse part 151 in the normal first state, and may be in contact with the movable fuse part 151 in the activated second state. The fixed part 157 may extend from the second terminal 156, and the second terminal 156 may have a predetermined height such that the fixed part 157 is spaced apart from the movable fuse part 151. The second terminal 156 may have a shape of a riser. The fixed fuse part 155 may be disposed on the vent cover 130 or the cap plate 122 while being electrically insulated from the vent cover 130 and/or the cap plate 122. For example, an electrically insulating substrate 154 may be disposed between the fixed fuse part 155 and the vent cover 130.

As will be described below, one of the movable fuse part 151 and the fixed fuse part 155 may be electrically connected to an electrode terminal 125 (see FIG. 17A), and the other thereof may be electrically connected to a circuit part 170 (see FIG. 17A). For example, the first terminal 152 of the movable fuse part 151 and the second terminal 156 of the fixed fuse part 155 may be used for electrical connection.

Figure 13A:
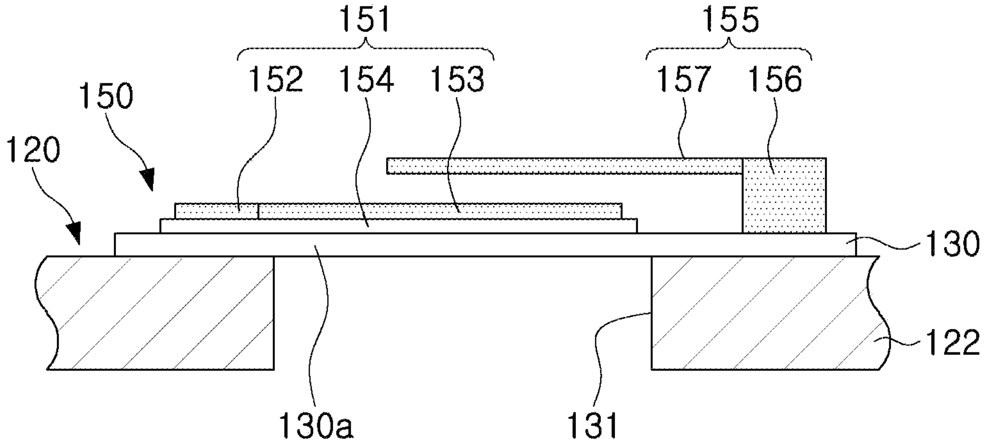
FIGS. 13A and 13B are cross-sectional views of a normally open vent fuse illustrated in FIG. 12.
Figure 13B:
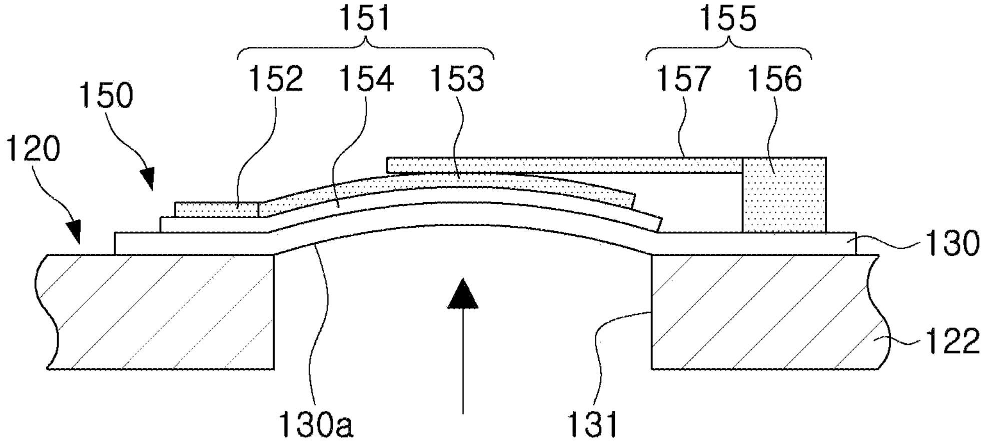

FIGS. 13A and 13B are cross-sectional views of a normally open vent fuse 150 illustrated in FIG. 12, and FIG. 13A generally illustrates a first state in which a normally open vent fuse 150 is open, and FIG. 13B illustrates a second state in which a normally open vent fuse 150 is closed.

As illustrated in FIG. 13A, in a normal first state, the normally open vent fuse 150 may have a state in which a movable fuse part 151 and a fixed fuse part 155 are spaced apart from each other. That is, since a movable part 153 of the movable fuse part 151 is not in contact with a fixed part 157 of the fixed fuse part 155, a circuit between a first terminal 152 and a second terminal 156 may be open.

FIG. 13B illustrates a second state in which the normally open vent fuse 150 is activated. When pressure inside the case 104 increases, a vent cover 130 may be deformed such that a deformation part 130*a* covering a venting hole 131 is inflated or expanded an external direction of a cap plate 122. As the deformation part 130*a* of the vent cover 130 is deformed, the movable part 153 attached to the deformation part 130*a* of the vent cover 130 may also be deformed in an external direction of the cap plate 122. As the pressure inside a case 104 increases to bulge the deformation part 130*a* of the vent cover 130, the movable part 153 of the movable fuse part 151 comes into contact with the fixed part 157 of the fixed fuse part 155. Accordingly, the circuit between the first terminal 152 and the second terminal 156 may be in a closed (connected) state.

Figure 14:
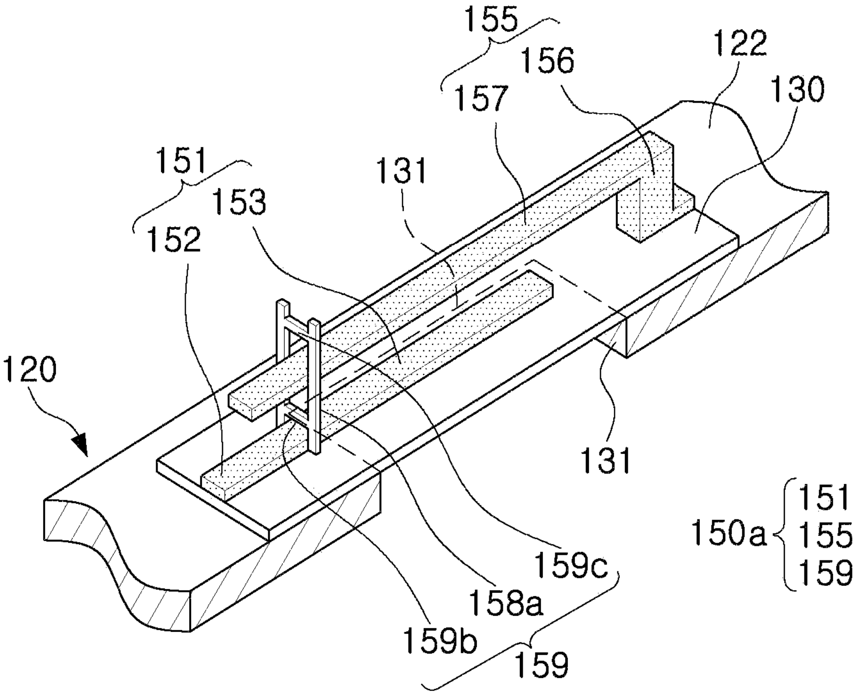
FIG. 14 is a perspective view of a normally open vent fuse according to another embodiment.

FIG. 14 is a perspective view of a normally open vent fuse 150*a* according to another embodiment.

A normally open vent fuse 150*a* illustrated in FIG. 14 is different from the normally open vent fuse 150 illustrated in FIGS. 12 to 13B in that it further includes a stopper 159.

The stopper 159 may limit a moving range of at least one of a movable fuse part 151 and a fixed fuse part 155. When a battery cell 100 is installed in an environment (e.g., a vehicle) in which vibration or an impact occurs, a circuit between a first terminal 152 and a second terminal 156 may be closed (connected) by vibration in the movable fuse part 151 and the fixed fuse part 155. The stopper 159 may limit a contact between the movable fuse part 151 and the fixed fuse part 155 by vibration or an impact in a state in which an internal pressure or temperature of the battery cell 100 does not increase.

The stopper 159 may include a first crossbar 159*b* disposed between the movable fuse part 151 and the fixed fuse part 155 so as to block an end of the fixed fuse part 155 from coming into contact with the fixed fuse part 155. The first crossbar 159*b* may be disposed between the movable fuse part 151 and a portion adjacent to the end of the fixed fuse part 155 in a position deviating from a deformation part 130*a* of a vent cover 130. The stopper 159 may include a second crossbar 159*c* limiting a movement of the movable fuse part 151 in an external direction of the cap plate 122. The stopper 159 may include a support bar 159*a* for supporting the first crossbar 159*b* and/or the second crossbar 159*c*. The support bar 159*a* may be disposed on the vent cover 130 or the cap plate 122 in a position deviating from the deformation part 130*a* of the vent cover 130.

Figure 15A:
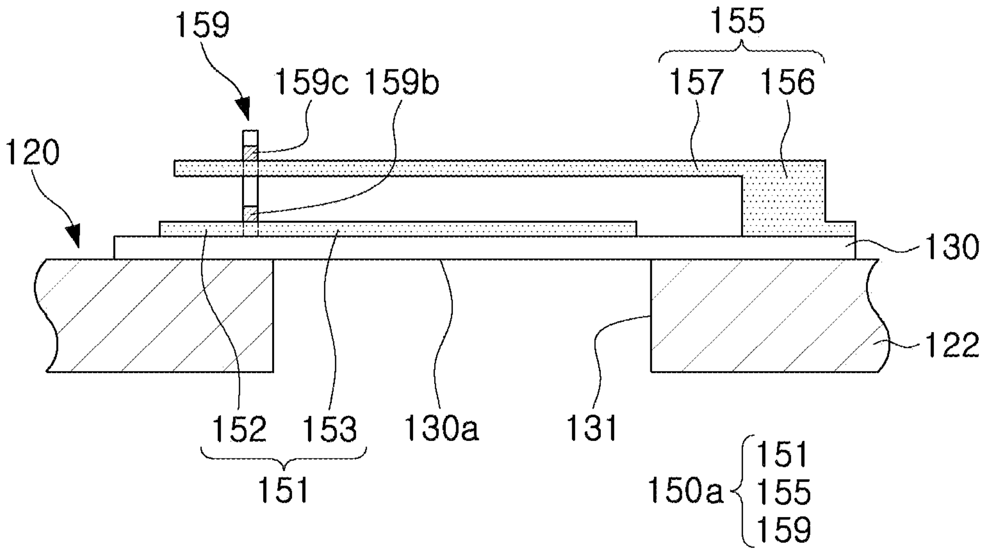
FIGS. 15A and 15B are cross-sectional views of a normally open vent fuse illustrated in FIG. 14, and FIG. 15A generally illustrates a state in which the normally open vent fuse is open.
Figure 15B:
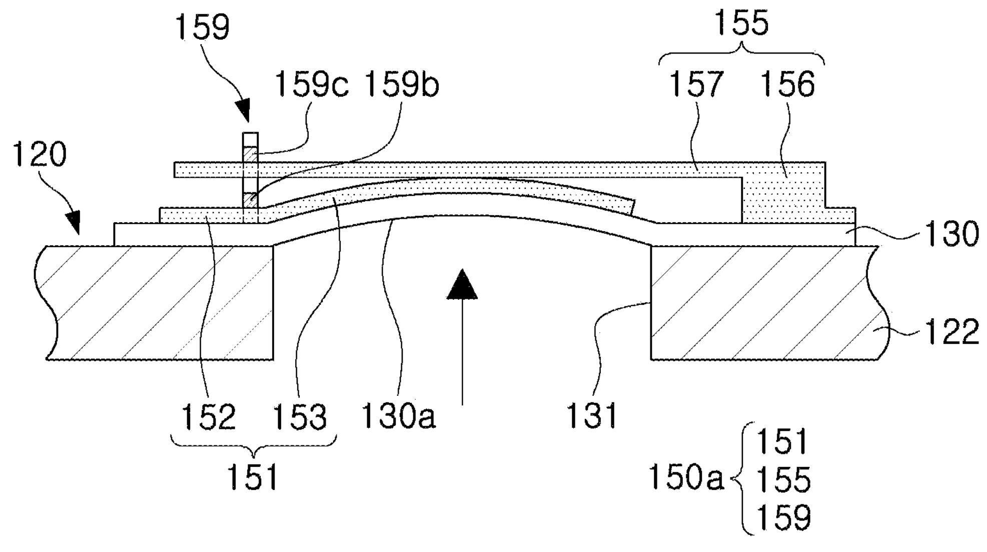

FIGS. 15A and 15B are cross-sectional views of a normally open vent fuse 150*a* illustrated in FIG. 14, and FIG. 15A illustrates a state in which a normally open vent fuse 150*a* is open, and FIG. 15B illustrates a state in which a normally open vent fuse 150*a* is closed.

As illustrated in FIG. 15A, in a normal first state, a normally open vent fuse 150*a* may have a state in which a movable fuse part 151 and a fixed fuse part 155 are spaced apart from each other. Since a first crossbar 159*b* of a stopper 159 is disposed between an end of the fixed fuse part 155 and the movable fuse part 151, a contact between the movable fuse part 151 and the fixed fuse part 155 may be stably blocked even when vibration or an impact is applied to a battery cell. Furthermore, the second crossbar 159*c* may limit a movement of the fixed fuse part 155 in an external direction of a cap plate 122 when vibration or an impact is applied to the battery cell.

FIG. 15B illustrates a second state in which the normally open vent fuse 150*a* is activated. As pressure inside a case 104 increases to bulge a deformation part 130*a* of the vent cover 130, a movable part 153 of the movable fuse part 151 may be in contact with a fixed part 157 of the fixed fuse part 155. In this case, since the first crossbar 159*b* is disposed in a position deviating from the deformation part 130*a*, the deformation part 130*a* and the movable part 153 may move in the external direction of the cap plate 122.

Figure 16:
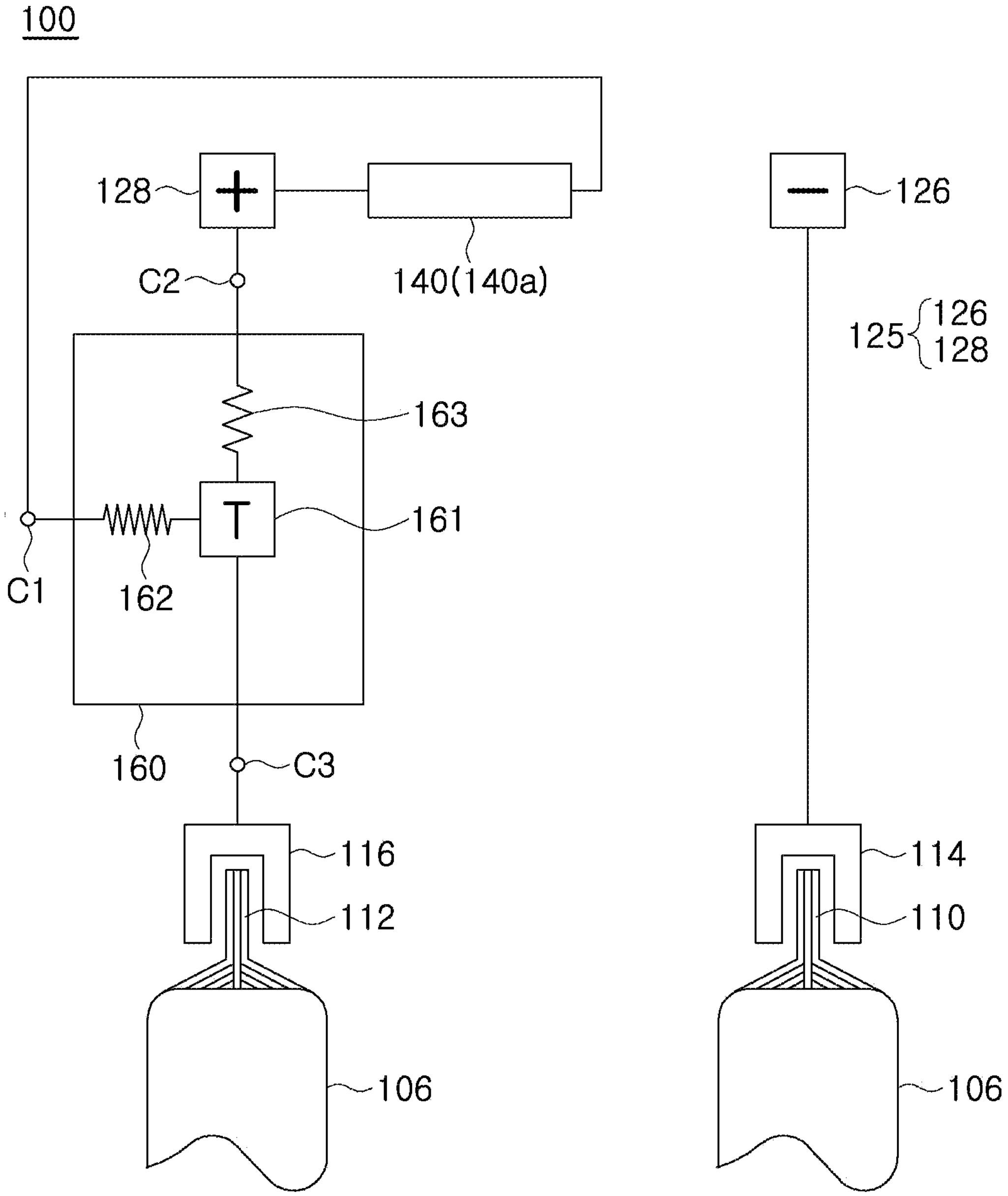
FIG. 16 is a schematic view illustrating a circuit connection structure of a normally closed vent fuse and a circuit part according to one embodiment.

FIG. 16 is a schematic view illustrating a circuit connection structure between normally closed vent fuses 140 and 140*a* and a circuit part 160 according to one embodiment.

Referring to FIGS. 9 to 11 and 16 together, a battery cell 100 according to one embodiment may include a vent cover 130 and a vent fuse 140 and 140*a*. The vent cover 130 may be disposed in a venting hole 131 to open the venting hole 131 when pressure inside a case 104 exceeds a predetermined pressure. The vent fuses 140 and 140*a* may be electrically connected to an electrode terminal 125 and may operate to block current flow between the electrode terminal 125 and the outside by discharging gas through the vent cover 130 or by deforming the vent cover 130. The vent fuses may be provided as the normally closed vent fuses 140 and 140*a* described with reference to FIGS. 9 to 11.

The battery cell 100 according to one embodiment may include the vent fuses 140 and 140*a* and a circuit part 160 electrically connected to the electrode terminal 125. The circuit part 160 may operate in a first state of allowing current flow between the electrode terminal 125 and the outside, or may operate in a second state of blocking current flow between the electrode terminal 125 and the outside by operation of the vent fuses 140 and 140*a*. The circuit part 160 may electrically connect an electrode assembly 106 and the electrode terminal 125 in a normal first state, and may at least partially block an electrical connection between the electrode assembly 106 and the electrode terminal 125 in an activated second state.

The electrode terminal 125 may include a cathode terminal 128 electrically connected to a cathode foil 112 of the electrode assembly 106 and an anode terminal 126 electrically connected to an anode foil 110 of the electrode assembly 106. The cathode foil 112 may be electrically connected to a cathode terminal 128 through a cathode connector 116, and the anode foil 110 may be electrically connected to an anode terminal 126 through an anode connector 114. In FIG. 16, for convenience of illustrating, the cathode foil 112 and the anode foil 110 are connected to the electrode assembly 106, but the cathode foil 112 and the anode foil 110 may have a shape extending from the same electrode assembly 106.

The circuit part 160 may electrically connect the cathode terminal 128 and the cathode foil 112 in the normal first state, or may electrically connect the anode terminal 126 and the anode foil 110. The circuit part 160 may block an electrical connection between the cathode terminal 128 and the cathode foil 112 in an activated first state, or may block an electrical connection between the anode terminal 126 and the anode foil 110. For convenience of explanation, FIG. 16 illustrates one embodiment in which the circuit part 160 is electrically connected to the cathode terminal 128, but the circuit part 160 may have a configuration in which it is electrically connected to the anode terminal 126, and a plurality of circuit parts 160 may be electrically connected to the cathode terminal 128 and the anode terminal 126, respectively.

The vent fuses may be provided as normally closed vent fuses 140 and 140*a* that are electrically connected to the circuit part 160 in a first state and are not electrically connected to the circuit part 160 in a second state. As described with reference to FIGS. 9 to 11, the normally closed vent fuses 140 and 140*a* may include a fuse part 143 disconnected by discharging gas through the vent cover 130 or by deforming the vent cover 130. At least a portion of the fuse part 143 may be melted and disconnected by discharging gas through the venting hole 131.

The circuit part may be provided as a transistor-type circuit part 160 including a transistor 161 functioning or configured to operate in a normal first state or in an activated second state.

The transistor-type circuit part 160 may include a first link C1 electrically connected to the normally closed vent fuses 140 and 140*a*, a second link C2 electrically connected to the electrode terminal 125, and a third link C3 electrically connected to the electrode assembly 106. In one embodiment, the second link C2 is electrically connected to the cathode terminal 128, and the third link C3 may be electrically connected to the cathode foil 112 through the cathode connector 116. Accordingly, the transistor 161 may be electrically connected to the normally closed vent fuses 140 and 140*a* through the first link C1, may be electrically connected to the cathode terminal 128 through the second link C2, and may be electrically connected to the cathode foil 112 through the third link C3. For example, a portion of the transistor 161 electrically connected to the first link C1 may function as a base, and a portion thereof electrically connected to the second link C2 and the third link C3 may function as a collector or an emitter, respectively.

The transistor-type circuit part 160 may include at least one of a first resistor 162 disposed between the first link C1 and the transistor 161, and a second resistor 163 disposed between the second link C2 and the transistor 161. When both the first resistor 162 and the second resistor 163 are disposed in the transistor-type circuit part 160, a resistance of the first resistor 162 may have a value greater than a resistance of the second resistor 163. That is, the first resistor 162 may be provided as a higher resistance resistor than the second resistor 163.

When internal pressure of the battery cell 100 is usually less than a deformation threshold of the normally closed vent fuses 140 and 140*a*, a current may flow to the transistor 161 through the normally closed vent fuses 140 and 140*a* and the first resistor 162. The current flow allows the transistor 161 to be converted into a closed circuit. That is, when the current is supplied through the first link C1, the transistor 161 may have a state in which the current flow can be performed between the second link C2 and the third link C3. Accordingly, the current may flow from the electrode assembly 106 to the cathode terminal 128 through the transistor 161 and the second resistor 163. Since the resistance of the second resistor 163 has a value smaller than that of the first resistor 162, a current loss in the normal first state may be minimized. That is, since the resistance of the first resistor 162 is higher than that of the second resistor 163, only a small amount of current may be used to turn the transistor 161 on.

When the internal pressure of the battery cell 100 is in a second state in which the deformation threshold of the normally closed vent fuses 140 and 140*a* is exceeded, the normally closed vent fuses 140 and 140*a* may be activated. That is, the normally closed vent fuses 140 and 140*a* are disconnected, and accordingly, a circuit that provides a current to the first resistor 162 is blocked. When no current is supplied through the first link C1, the transistor 161 may have a state in current flow between the second link C2 and the third link C3 is blocked. When current supply of the first resistor 162 is cut off from the normally closed vent fuses 140 and 140*a*, the transistor 161 is converted into an open circuit, and the current flow from the cathode foil 112 of the electrode assembly 106 to the cathode terminal 128 is blocked. In this manner, in the second state in which the normally closed vent fuses 140 and 140*a* are activated, the circuit part 160 may block the current flow from the cathode foil 112 to the cathode terminal 128, thereby blocking current flow between the electrode terminal 125 and the outside.

When current flow between the battery electrode terminal 125 and the outside is blocked, a battery management system (e.g., a controller 20 of FIG. 19) may detect defects in a battery cell 100.

Figure 17A:
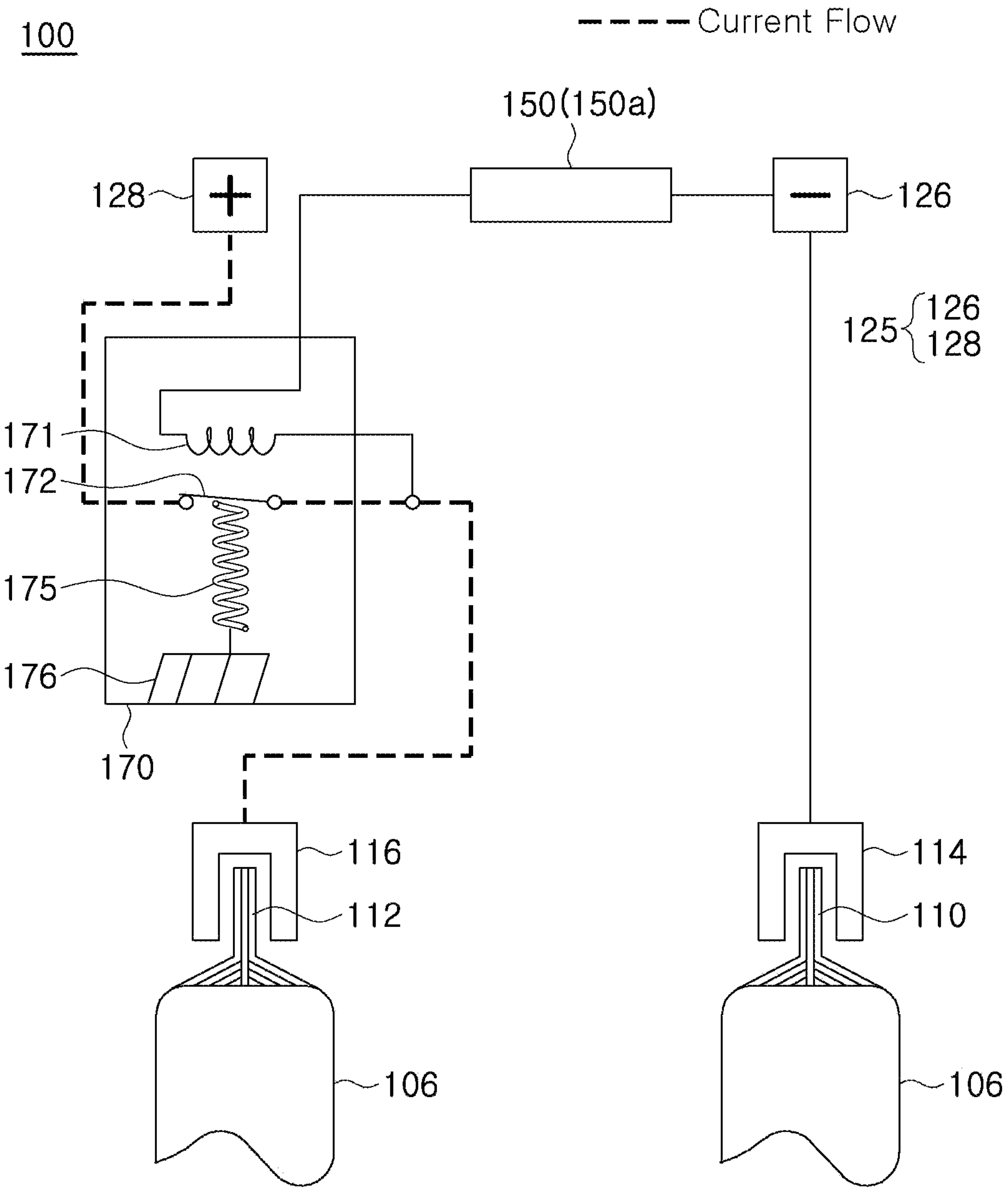
FIGS. 17A and 17B are schematic views illustrating a circuit connection structure of a normally open vent fuse and a circuit part according to one embodiment.
Figure 17B:
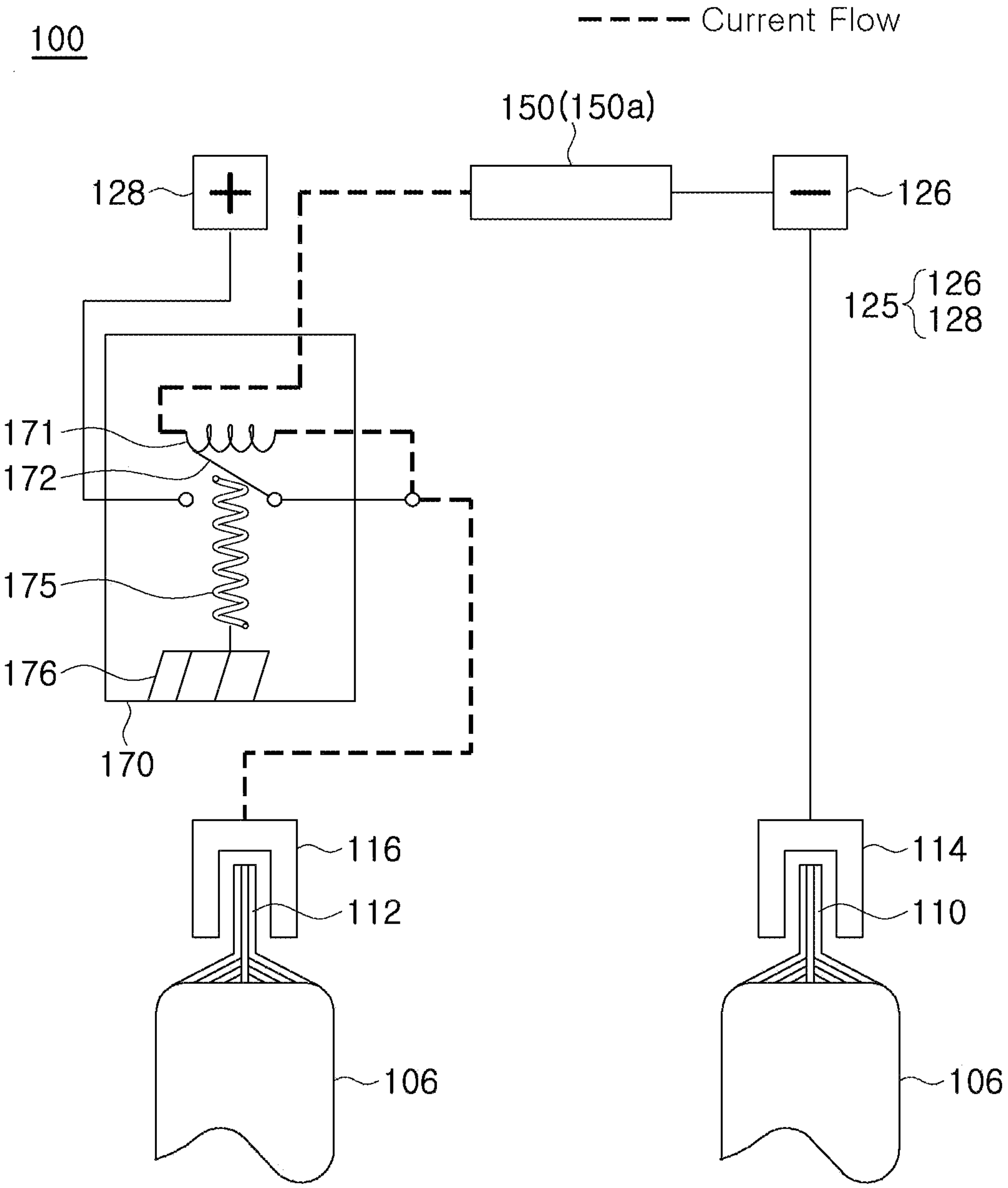

FIGS. 17A and 17B are schematic views illustrating a circuit connection structure of normally open vent fuses 150 and 150*a* and a circuit part 170 according to one embodiment, and FIG. 17A illustrates current flow in a state in which normally open vent fuses 150 and 150*a* are open, and FIG. 17B illustrates current flow in a state in which the normally open vent fuses 150 and 150*a* are closed.

Referring to FIGS. 12 to 15B and FIGS. 17A and 17B together, a battery cell 100 according to one embodiment may include a vent cover 130 and a vent fuse 150 and 150*a*. The vent cover 130 may be disposed in a venting hole 131 to open the venting hole 131 when pressure inside a case 104 exceeds a predetermined pressure. The vent fuses 150 and 150*a* may be electrically connected to an electrode terminal 125 and may operate to block current flow between the electrode terminal 125 and the outside by deforming the vent cover 130. The vent fuses may be provided as the normally open vent fuses 150 and 150*a* described with reference to FIGS. 12 to 15B.

The battery cell 100 according to one embodiment may include the vent fuses 150 and 150*a* and a circuit part 170 electrically connected to the electrode terminal 125. The circuit part 170 may operate in a normal first state of allowing current flow between the electrode terminal 125 and the outside, or may operate in an activated second state of blocking current flow between the electrode terminal 125 and the outside by operation of the vent fuses 150 and 150*a*. The circuit part 170 may electrically connect an electrode assembly 106 and the electrode terminal 125 in the normal first state, and at least partially block the electrical connection between the electrode assembly 106 and the electrode terminal 125 in the activated second state.

The electrode terminal 125 may include a cathode terminal 128 electrically connected to a cathode foil 112 of the electrode assembly 106 and an anode terminal 126 electrically connected to an anode foil 110 of the electrode assembly 106. The cathode foil 112 may be electrically connected to the cathode terminal 128 through a cathode connector 116, and an anode foil 110 may be electrically connected to an anode terminal 126 through an anode connector 114. For convenience of illustrating, FIGS. 17A and 17B illustrates a state in which the cathode foil 112 and the anode foil 110 are connected to the electrode assembly 106, respectively, but the cathode foil 112 and the anode foil 110 may have a shape extending from the same electrode assembly 106.

The circuit part 170 may electrically connect the cathode terminal 128 and the cathode foil 112, or may electrically connect the anode terminal 126 and the anode foil 110 in the normal first state. The circuit part 170 may block an electrical connection between the cathode terminal 128 and the cathode foil 112, or may block an electrical connection between the anode terminal 126 and the anode foil 110 in an activated first state.

The vent fuses may be provided as normally open vent fuses 150 and 150*a* that are not electrically connected to the circuit part 170 in the normal first state and are electrically connected to the circuit part 170 in the activated second state. As described with reference to FIGS. 12 to 15B, the normally open vent fuses 150 and 150*a* may include a movable fuse part 151 and a fixed fuse part 155. At least a portion of the movable fuse part 151 may be attached to the vent cover 130, and may be moved in an external direction of a cap plate 122 by deforming the vent cover 130. The fixed fuse part 155 may be spaced apart from the movable fuse part 151 in the normal first state and may be in contact with the movable fuse part 151 by deforming the movable fuse part 151 in the activated second state.

One of the movable fuse part 151 and the fixed fuse part 155 may be electrically connected to the electrode terminal 125, and the other thereof may be electrically connected to the circuit part 170. For example, the movable fuse part 151 may be electrically connected to the anode terminal 126, and the fixed fuse part 155 may be electrically connected to the cathode terminal 128, and vice versa.

The circuit part may be provided as a relay-type circuit part 170 including a relay functioning or configured to operate in the normal first state or the activated second state. The relay is a device serving as a switch, and the switch may be turned on or off depending on conditions.

The relay-type circuit part 170 may include a switch 172 and a coil 171. The switch 172 may be switched to electrically connect an electrode foil (e.g., the cathode foil 112) of a first polarity of the electrode assembly 106 to the electrode terminal 125 (e.g., cathode terminal 128) of the first polarity. When the switch 172 is turned on, current flow may occur between the electrode assembly 106 and the electrode terminal 125.

The normally open vent fuse 150 and 150*a* may be electrically connected to a coil 171 and an electrode terminal (e.g., the anode terminal 126) of the second polarity. That is, the coil 171 may be electrically connected to an electrode terminal (e.g., the anode terminal 126) of the second polarity through the normally open vent fuses 150 and 150*a*. Furthermore, the coil 171 may be disposed between the normally open vent fuses 150 and 150*a* and the electrode foil of the first polarity. A current may be applied to the coil 171 in a second state in which the normally open vent fuses 150 and 150*a* are activated. That is, the coil 171 may be electrically connected between the electrode foil (e.g., the cathode foil 112) of the first polarity and the electrode terminal (e.g., the anode terminal 126) of the second polarity in the second state. When the current is supplied to the coil 171, the coil 171 may be magnetized. The switch 172 may be opened (turned off) by the current flowing through the coil 171 in the second state in which the normally open vent fuses 150 and 150*a* are activated, thus blocking an electrical connection between the electrode foil of the first polarity and the electrode terminal of the first polarity. The switch 172 may have magnetic characteristics so as to move by the magnetized coil 171.

For example, one side of the normally open vent fuses 150 and 150*a* may be electrically connected to the anode terminal 126, and the other side thereof may be electrically connected to the coil 171 of the relay-type circuit part 170. One side of the switch 172 may be electrically connected to the cathode terminal 128 and the other side thereof may be electrically connected to the cathode foil 112.

Referring to FIG. 17A, in a normal first state, normally open vent fuses 150 and 150*a* have an open circuit because a movable fuse part 151 and a fixed fuse part 155 are not in contact with each other. Accordingly, a current may be prevented from flowing through the normally open vent fuses 150 and 150*a* in the normal first state. Instead, as illustrated by dotted lines, the current may flow to a cathode terminal 128 through a cathode foil 112, a cathode connector 114, and a switch 172 of an electrode assembly 106. A relay-type circuit part 170 may allow current flow between the cathode foil 112 and the cathode terminal 128 in the normal first state, so that the current can flow between the cathode terminal 128 and the outside.

On the other hand, the relay-type circuit part 170 may include a spring 175 providing elastic force so that the switch 172 may stably remain turned on in the normal first state. The spring 175 may provide the elastic force to the switch 172 so that the electrode foil (e.g., the cathode foil 112) of the first polarity is kept electrically connected to the electrode terminal 125 (e.g., the cathode terminal 128) of the first polarity. One side of the spring 175 may be supported by a spring base 176, and the other side of the spring 175 may be coupled to the switch 172. In the normal first state, the switch 172 may be stably turned on by the spring 175, even when vibration or an impact occurs.

Referring to FIG. 17B, when internal pressure of the battery cell 100 increases to activate the normally open vent fuses 150 and 150*a*, the movable fuse part 151 and the fixed fuse part 155 may be in contact with each other to form a closed circuit. Accordingly, in the second state in which the normally open vent fuses 150 and 150*a* are activated, a current may flow through the normally open vent fuses 150 and 150*a*. Accordingly, the coil 171 may be electrically connected to the anode terminal 126 through the normally open vent fuses 150 and 150*a*. When the current flows through the coil 171, the coil 171 may be magnetized and the switch 172 having magnetic characteristics may be opened. Accordingly, current flow between the cathode foil 112 and the cathode terminal 128 of the electrode assembly 106 may be blocked. In this manner, in the second state in which the normally open vent fuses 150 and 150*a* are activated, the circuit part 170 may block current flow between the cathode foil 112 and the cathode terminal 128, thereby blocking current flow between the electrode terminal 125 and the outside. When current flow between the battery electrode terminal 125 and the outside is blocked, a battery management system (e.g., a controller 20 of FIG. 19) may detect defects in the battery cell 100.

In the second state in which the normally open vent fuses 150 and 150*a* are activated, the switch 172 may be moved by the magnetized coil 171 in an off state. In this case, magnetic force applied to the coil 171 and the switch 172 may have a value greater than elastic force of the spring 175.

In another embodiment, there may be a notch or a hook below the coil 171 that must pass when the coil 171 is magnetized and the switch 172 is attracted by the magnetized coil 171. The notch or the hook may prevent the switch 172 from returning to an operable position of FIG. 17A when the coil 171 is no longer magnetized.

Figure 18:
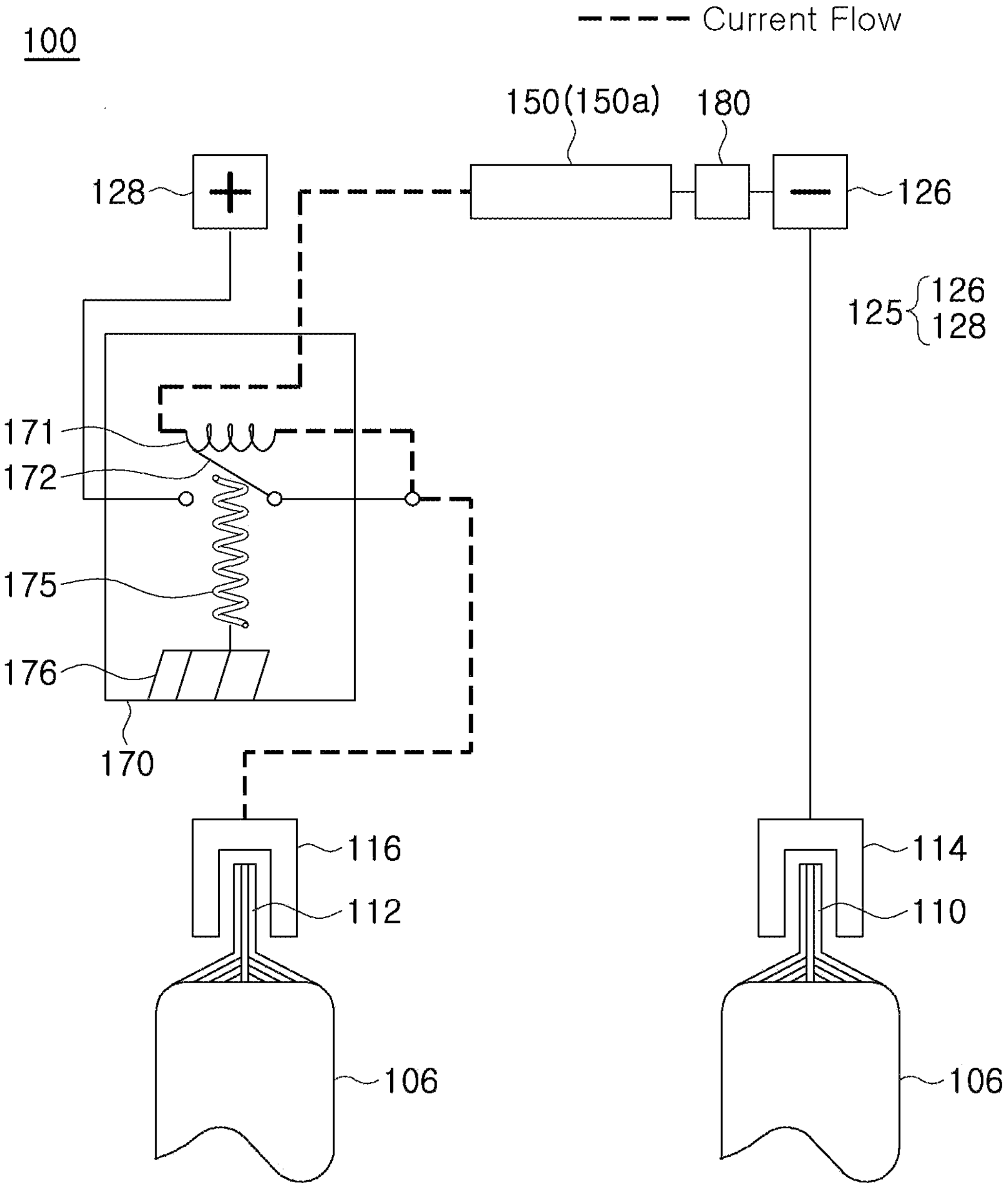
FIG. 18 is a schematic view illustrating a circuit connection structure of a normally open vent fuse and a circuit part according to another embodiment.

FIG. 18 is a schematic view illustrating a circuit connection structure between normally open vent fuses 150 and 150*a* and a circuit part 170 according to another embodiment.

A battery cell 100 illustrated in FIG. 18 differs from the battery cell illustrated in FIG. 17B in that it further includes a current limiting part 180.

The current limiting part 180 may be disposed in series in a normally open vent fuse 150 and 150*a* to limit a flow of a current equal to or greater than a set value in the coil 171. For example, the current limiting part 180 may be disposed between the normally open vent fuses 150 and 150*a* and an electrode terminal (e.g., an anode terminal 126) of a second polarity. The current limiting part 180 may prevent the coil 171 from being shorted from too much current. For example, the current limiting part 180 may be provided as a resistor.

Figure 19:
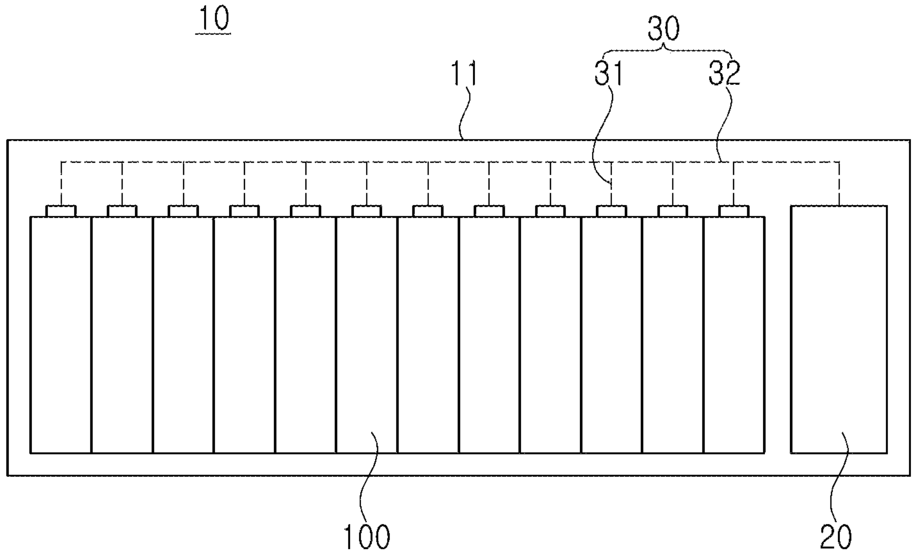
FIG. 19 is a schematic view of a battery device according to one embodiment.

FIG. 19 is a schematic view of a battery device 10 according to one embodiment.

Referring to FIG. 19, a battery device 10 may include a plurality of battery cells 100, a housing 11 accommodating the plurality of battery cells 100, and a controller 20.

The plurality of battery cells 100 may include a battery cell including the vent fuses 140, 140*a*, 150 and 150*a* described with reference to FIGS. 9 to 18. The vent fuses 140, 140*a*, 150 and 150*a* may operate to block current flow between an electrode terminal 125 and the outside by discharging gas through the vent cover 130 or by deforming the vent cover 130.

Furthermore, the plurality of battery cells 100 may include circuit parts 150 and 160 described with reference to FIGS. 16 to 18. The circuit parts 150 and 160 may be electrically connected to the vent fuses 140, 140*a*, 150 and 150*a* and the electrode terminal 125. The circuit parts 150 and 160 may normally operate to allow current flow between the electrode terminal 125 and the outside in a first state. The circuit parts 150 and 160 may operate in a second state of blocking current flow between the electrode terminal 125 and the outside by operation of the vent fuses 140, 140*a*, 150 and 150*a* when an event or the like occurs in the battery cell 100 to increase pressure inside the battery cell 100.

A controller 20 may include a battery management system (BMS) or may be provided as a portion of the battery management system. The controller 20 may be connected to at least one of the plurality of battery cells 100 through a signal line 30. The signal line 30 may include a first line 31 connected to the plurality of battery cells and a second line 32 connected to the controller 20. The second line 32 may include a plurality of lines connected to the first line 31 to sense output voltages of the plurality of battery cells. The first line 31 may be electrically connected to the signal terminal ST illustrated in FIG. 11.

The controller 20 may output an abnormal signal or block or limit an operation of the at least one battery cell when at least one of current and voltage is not detected from the battery cell 100 among the plurality of battery cells. For example, when at least one of current and voltage is not detected in at least one battery cell, the controller 20 may interpret that internal pressure of the battery cell increases to drive the vent fuses 140, 140*a*, 150 and 150*a*. Accordingly, the controller 20 may perform a series of control of delaying or blocking an occurrence of thermal runaway in a plurality of battery cells 100 disposed inside the battery device 10. For example, the controller 20 may block or limit the use of battery cells having increased pressure in the plurality of battery cells disposed inside the battery device 10, and surrounding battery cells thereof. Furthermore, the controller 20 may block or limit an operation of the entire plurality of battery cells disposed inside the battery device 10.

Functions performed in a process and method may be implemented in a different order. In addition, outlined steps and operations may be only provided as examples, and some of the steps and operations may be optional, combined into fewer steps and operations, or expanded into additional steps and operations without detracting from the essence of the disclosed embodiments.

Only specific examples of implementations of certain embodiments are described. Variations, improvements and enhancements of the disclosed embodiments and other embodiments may be made based on the disclosure of this patent document.

In addition, the embodiment has been described using a prismatic battery cell as an example, but the embodiment may be applied to a cylindrical battery cell or a coin-type battery cell.

What is claimed is:

1. A battery cell comprising:

a case configured to accommodate an electrode assembly;

a cap plate configured to cover the case;

an electrode terminal disposed on the cap plate and electrically connected to the electrode assembly;

a vent cover disposed in the cap plate separately from the electrode terminal in a venting hole to open the venting hole when pressure inside the case is equal to or greater than a predetermined pressure; and a vent fuse electrically connected to the electrode terminal and configured to operate to block current flow between the electrode terminal and the outside thereof by discharging gas through the vent cover or by deforming the vent cover.

2. The battery cell of claim 1, wherein the vent fuse is attached to an external surface of the vent cover and disposed to cover at least a portion of the vent cover.

3. The battery cell of claim 1, further comprising:

a circuit part electrically connected to the vent fuse and the electrode terminal, wherein the circuit part operates in a first state in which current flow is permitted between the electrode terminal and the outside thereof, or operates in a second state in which current flow between the electrode terminal and the outside thereof is blocked by operation of the vent fuse.

4. The battery cell of claim 3, wherein the circuit part is configured to electrically connect the electrode assembly and the electrode terminal in the first state and is configured to at least partially block an electrical connection between the electrode assembly and the electrode terminal in the second state.

5. The battery cell of claim 4, wherein the electrode terminal includes a cathode terminal electrically connected to a cathode foil of the electrode assembly and an anode terminal electrically connected to an anode foil of the electrode assembly, in the first state, the circuit part is configured to electrically connect the cathode terminal and the cathode foil, or configured to electrically connect the anode terminal and the anode foil, and in the second state, the circuit part is configured to block an electrical connection between the cathode terminal and the cathode foil, or configured to block an electrical connection between the anode terminal and the anode foil.

6. The battery cell of claim 3, wherein the vent fuse is provided as a normally closed vent fuse that is configured to be electrically connected to the circuit part in the first state and is configured not to be electrically connected to the circuit part in the second state.

7. The battery cell of claim 6, wherein the normally closed vent fuse comprises a fuse part disposed on the vent cover and disconnected by discharging gas through the vent cover or by deforming the vent cover, a first terminal disposed on one side of the fuse part and electrically connected to the electrode terminal, and a second terminal disposed on the other side of the fuse part and electrically connected to the circuit part.

8. The battery cell of claim 7, wherein at least a portion of the fuse part is configured to be melted and disconnected by discharging gas through the venting hole.

9. The battery cell of claim 6, wherein the circuit part is provided as a transistor circuit part including a transistor configured to operate in the first state or in the second state.

10. The battery cell of claim 9, wherein the transistor circuit part comprises a first link electrically connected to the normally closed vent fuse, a second link electrically connected to the electrode terminal, and a third link electrically connected to the electrode assembly, and the transistor circuit part includes at least one of a first resistor disposed between the first link and the transistor and a second resistor disposed between the second link and the transistor.

11. The battery cell of claim 10, wherein a resistance of the first resistor has a value greater than a resistance of the first resistor.

12. The battery cell of claim 3, wherein the vent fuse is provided as a shorting vent fuse that is configured not to be electrically connected to the circuit part in the first state and is configured to be electrically connected to the circuit part in the second state.

13. The battery cell of claim 12, wherein the shorting vent fuse comprises a movable fuse part configured to attach at least portion thereof to the vent cover and move in an external direction of the cap plate by deforming the vent cover, and a fixed fuse part fixed to the vent cover or the cap plate, the fixed fuse part configured to be spaced apart from the movable fuse part in the first state and configured to be in contact with the movable fuse part by deforming the movable fuse part in the second state, and one of the movable fuse part and the fixed fuse part is configured to be electrically connected to the electrode terminal, and the other thereof is configured to be electrically connected to the circuit part.

14. The battery cell of claim 13, wherein the shorting vent fuse comprises a stopper configured to limit a moving range of at least one of the movable fuse part and the fixed fuse part so that the movable fuse part and the fixed fuse part do not come into contact with each other in the first state.

15. The battery cell of claim 12, wherein the circuit part is provided as a relay circuit part including a relay configured to operate in the first state or operate in the second state.

16. The battery cell of claim 15, wherein the relay circuit part comprises a switch configured to be switched to electrically connect an electrode foil of a first polarity of the electrode assembly to an electrode terminal of the first polarity, and a coil configured to be electrically connected between the shorting vent fuse and the electrode foil of the first polarity, the coil having a current applied thereto in the second state, and in the second state, the switch is configured to be opened by current flowing through the coil to block an electrical connection between the electrode foil of the first polarity and the electrode terminal of the first polarity.

17. The battery cell of claim 16, further comprising:

a spring configured to provide elastic force to the switch so that in the first state, the switch maintains a state in which the electrode foil of the first polarity is electrically connected to the electrode terminal of the first polarity.

18. The battery cell of claim 16, wherein the shorting vent fuse is configured to be electrically connected to an electrode terminal of a second polarity, and the coil is configured to be electrically connected between the electrode foil of the first polarity and the electrode terminal of the second polarity in the second state.

19. The battery cell of claim 18, further comprising:

a current limiting part disposed in series in the shorting fuse to limit a flow of a current equal to or greater than a set value in the coil in the second state.

20. A battery device comprising:

a plurality of battery cells;

a housing configured to accommodate the plurality of battery cells; and a controller connected to at least one of the plurality of battery cells to control at least one of the plurality of battery cells, wherein at least one of the plurality of battery cells comprises a case for accommodating an electrode assembly, a cap plate covering the case, an electrode terminal disposed on the cap plate and electrically connected to the electrode assembly, a vent cover disposed in the cap plate separately from the electrode terminal in a venting hole to open the venting hole when pressure inside the case is equal to or greater than a predetermined pressure, and a vent fuse electrically connected to the electrode terminal and configured to operate to block current flow between the electrode terminal and the outside thereof by discharging gas through the vent cover or by deforming the vent cover, and the controller outputs an abnormal signal or blocks or limits an operation of at least one battery cell when at least one of a current and voltage is not detected from at least one of the plurality of battery cells.

* * * * *